(12) United States Patent
Oh et al.

(10) Patent No.: US 9,900,574 B2
(45) Date of Patent: Feb. 20, 2018

(54) METHOD AND APPARATUS FOR TRANSMITTING AND RECEIVING BROADCAST SIGNAL SO AS TO ADJUST COLOUR RANGE OF CONTENT

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/518,684

(22) PCT Filed: Nov. 3, 2015

(86) PCT No.: PCT/KR2015/011692
§ 371 (c)(1),
(2) Date: Apr. 12, 2017

(87) PCT Pub. No.: WO2016/072693
PCT Pub. Date: May 12, 2016

(65) Prior Publication Data
US 2017/0237962 A1    Aug. 17, 2017

Related U.S. Application Data

(60) Provisional application No. 62/074,656, filed on Nov. 4, 2014.

(51) Int. Cl.
*H04N 5/38* (2006.01)
*H04N 11/06* (2006.01)
(Continued)

(52) U.S. Cl.
CPC ............ *H04N 11/06* (2013.01); *H04N 11/002* (2013.01); *H04N 5/38* (2013.01); *H04N 5/44* (2013.01)

(58) Field of Classification Search
CPC ............ H04N 9/67; H04N 7/08; H04N 7/088; H04N 7/015; H04N 21/236; H04N 21/434;
(Continued)

(56) References Cited

U.S. PATENT DOCUMENTS 8,446,961 B2 *  5/2013  Chiu ...................... H04N 1/64
                                             375/240.18
2012/0050767 A1   3/2012  Tanaka
(Continued)

FOREIGN PATENT DOCUMENTS

WO   2013/006001 A2   1/2013
WO   2014/084564 A1   6/2014

OTHER PUBLICATIONS

Kerofsky, et al.: "Color Gamut Scalable Video Coding", IEEE, 2013 Data Compression Conference, Mar. 20-22, 2013, pp. 211-220.

*Primary Examiner* — Trang U Tran
(74) *Attorney, Agent, or Firm* — Dentons US LLP

(57) ABSTRACT

The present invention provides a method and an apparatus for transmitting and receiving a broadcast signal so as to adjust a colour range of content. The method for transmitting a broadcast signal according to an embodiment of the present invention comprises the steps of: encoding video data and signalling information including metadata with respect to the gamut of the video data; generating a broadcast signal including the encoded video data and signalling information; and transmitting the generated broadcast signal.

14 Claims, 17 Drawing Sheets

(51) Int. Cl.
*H04N 11/24* (2006.01)
*H04N 5/44* (2011.01)

(58) Field of Classification Search
CPC ........... H04N 21/4363; H04N 21/2343; H04N 21/25825; H04N 21/43635; H04N 11/06; H04N 11/002
USPC .......................... 348/474, 723, 725, 465–467
See application file for complete search history.

(56) References Cited

U.S. PATENT DOCUMENTS

| | | |
|---|---|---|
| 2014/0079134 A1 | 3/2014 | Chiu et al. |
| 2015/0296232 A1* | 10/2015 | Hwang ............ H04N 21/23432 348/473 |
| 2016/0105695 A1* | 4/2016 | Qu ..................... H04N 21/2353 348/708 |
| 2016/0241829 A1* | 8/2016 | Qu ......................... G09G 5/006 |

* cited by examiner $$x_B = \alpha \cdot x_D + (1-\alpha) \cdot x_C$$
$$y_B = \alpha \cdot y_D + (1-\alpha) \cdot y_C$$
~ L6010

$$d_{AC} = \sqrt{(x_C - x_A)^2 + (y_C - y_A)^2} \ \ \& \ \ d_{BC} = \sqrt{(x_C - x_B)^2 + (y_C - y_B)^2}$$ ~ L6020

$$C_O = \begin{cases} C_I & if\ d_{AC} < d_{BC} \\ (1-\omega) \cdot C_I + \omega \cdot MC_I & else \end{cases}$$ ~ L6030

$$\omega = f(1/\sqrt{(x_{A'} - x_{B'})^2 + (y_{A'} - y_{B'})^2})$$ ~ L6040

FIG. 7

| Syntax | Category | Descriptor |
|---|---|---|
| sei_payload( payloadType, payloadSize ) { | | |
| . . . | | |
| if( payloadType == 54 ) | | |
| enhanced_gamut_mapping_info(payloadSize) | 5 | |

— L7010

L7020

| Syntax | No. of bits | Format |
|---|---|---|
| enhanced_gamut_mapping_info(payloadSize) { | | |
| original_color_gamut_type | 4 | uimsbf |
| target_color_gamut_type | 4 | uimsbf |
| if(original_color_gamut_type=='0110'){ | | |
| RGBW_primaries() | | |
| } | | |
| if(target_color_gamut_type=='0110'){ | | |
| RGBW_primaries() | | |
| } | | |
| reserved | 4 | uimsbf |
| initial_mapping_type | 4 | uimsbf |
| initial_mappng_info() | | |
| color_space_type | 4 | uimsbf |
| color_space_conversion_flag | 1 | uimsbf |
| reserved | 3 | uimsbf |
| if(color_space_conversion_flag=='1'){ | | |
| color_space_conversion_function() | | |
| } | | |
| number_of_regions | 4 | uimsbf |
| reserved | 4 | uimsbf |
| for(i=0; i<number_of_regions; i++) { | | |
| region_boundary_type | 4 | uimsbf |
| reserved | 4 | uimsbf |
| region_boundary_info() | | |
| adaptive_mapping_weight_type | 4 | uimsbf |
| reserved | 4 | uimsbf |
| weighting_function_info () | | |
| } | | |
| } | | |

FIG. 8

| Original_color_gamut_type | Description | |
|---|---|---|
| 0000 | BT. 601 | L8010 |
| 0001 | BT. 709 | |
| 0010 | DCI-P3 | |
| 0011 | BT. 2020 (NCL) | |
| 0100 | BT. 2020 (CL) | |
| 0101 | XYZ | |
| 0110 | User defined | |
| 0111~1111 | Reserved | |

| Target_color_gamut_type | Description | |
|---|---|---|
| 0000 | BT. 601 | L8020 |
| 0001 | BT. 709 | |
| 0010 | DCI-P3 | |
| 0011 | BT. 2020 (NCL) | |
| 0100 | BT. 2020 (CL) | |
| 0101 | XYZ | |
| 0110 | User defined | |
| 0111~1111 | Reserved | |

FIG. 9

| Initial_mapping_type | Description |
|---|---|
| 0000 | Linear mapping function |
| 0001 | up table |
| 0010 | Display mapping function |
| 0011 | User define |
| 0111~1111 | Reserved |

— L9010

| Color_space_type | Description |
|---|---|
| 0000 | CIE 1931 Yxy color space |
| 0001 | CIE Lab color space |
| 0010 | CIE Luv |
| 0111~1111 | Reserved |

— L9020

| region_boundary_type | Description |
|---|---|
| 0000 | resrved |
| 0001 | Uniform circle from center |
| 0010 | Ratio of distance to gamut boundary |
| 0011 | Arbitrary region coordinate |
| 0111~1111 | Reserved |

— L9030

| adaptive_mapping_weight_type | Description |
|---|---|
| 0x00 | Linear function |
| 0x01 | Logarithmic function |
| 0x02 | Exponential function |
| 0x03 | $n^{th}$ order function |
| 0x05 | Look-up table |
| 0x06 ~ 0xFF | Reserved |

| Syntax | Description | Description |
|---|---|---|
| RGBW_primaries( ) { | | |
|     color_primary_r_x | 8 | uimsbf |
|     color_primary_r_y | 8 | uimsbf |
|     color_primary_g_x | 8 | uimsbf |
|     color_primary_g_y | 8 | uimsbf |
|     color_primary_b_x | 8 | uimsbf |
|     color_primary_b_y | 8 | uimsbf |
|     white_primary_x | 8 | uimsbf |
|     white_primary_y | 8 | uimsbf |
| } | | |

FIG. 11

| Syntax | No. of bits | Format |
|---|---|---|
| Initial_mapping_info( ) { | | |
|   if (Initial_mapping_type=='0000') { | | |
|     reserved | 3 | uimsbf |
|     number_of_coeff | 5 | uimsbf |
|     for(i=0; i<number_of_coeff; i++) | | |
|       Initial_mapping_function_coeff[i] | | |
|   } | | |
|   else if (initial_mapping_type=='0001') { | | |
|     LUT_type | 4 | uimsbf |
|     reserved | 4 | uimsbf |
|     LUT_info() | | |
|   } | | |
| } | | |

FIG. 12

$$\begin{bmatrix} r' \\ g' \\ b' \end{bmatrix} = \begin{bmatrix} coeff[0] & coeff[1] & coeff[2] \\ coeff[3] & coeff[4] & coeff[5] \\ coeff[6] & coeff[7] & coeff[8] \end{bmatrix} \begin{bmatrix} r \\ g \\ b \end{bmatrix} \quad \sim L12010$$

| LUT_type | Description |
|---|---|
| 0000 | LUT |
| 0001 | 3D LUT |
| 0010 | 3D LUT (linear interpolation) |
| 0011~1111 | Reserved |

| Syntax | No. of bits | Format |
|---|---|---|
| Color_space_conversion( ) { | | |
|     reserved | 3 | uimsbf |
|     number_of_coeff | 5 | uimsbf |
|     for(i=0; i<number_of_coeff; i++){ | | |
|         Color_space_conversion_coeff[i] | | |
|     } | | |
| } | | |

L13010

$$\begin{bmatrix} L \\ u \\ v \end{bmatrix} = \begin{bmatrix} coeff[0] & coeff[1] & coeff[2] \\ coeff[3] & coeff[4] & coeff[5] \\ coeff[6] & coeff[7] & coeff[8] \end{bmatrix} \begin{bmatrix} r \\ g \\ b \end{bmatrix} \quad \sim L13020$$

FIG. 14

| Syntax | No. of bits | Format |
|---|---|---|
| region_boundary_info( ) { <br>    distance_start_end_point_flag <br>    reserved <br>    if(distance_start_end_point_flag == '1') { <br>        distance_start_point_type <br>        distance_end_point_type <br>    } <br>    if(distance_start_point_type == '0010'){ <br>        start_x_index <br>        start_y_index <br>    } <br>    if(distance_end_point_type == '0010'){ <br>        end_x_index <br>        end_y_index <br>    } <br>    if(region_boundary_type == '0001' \|\| region_boundary_type == '0010' ) { <br>        alpha <br>    } <br>    if(region_boundary_type == '0011') { <br>        number_of_points <br>        reserved <br>        for(i=0; i<number_of_points; i++) { <br>            x_index[i] <br>            y_index[i] <br>        } <br>    } <br>} | 3<br>5<br><br><br><br><br><br>4<br>4 | uimsbf<br>uimsbf<br><br><br><br><br><br>uimsbf<br>uimsbf |

FIG. 15

| distance_start_point_type | Description |
|---|---|
| 0000 | White point – D65 |
| 0001 | White point – D50 |
| 0010 | index |
| 0011~ 1111 | Reserved |

—L15010

| distance_end_point_type | Description |
|---|---|
| 0000 | Target gamut boundary |
| 0001 | Original color |
| 0010 | index |
| 0011~ 1111 | Reserved |

| Syntax | No. of bits | Format |
|---|---|---|
| weighting_function_info( ) { | | |
|   if (DR_transformation_curve_type=='0x00') { | | |
|     gain | 3 | uimsbf |
|     offset | 5 | uimsbf |
|   } | | |
|   else if (DR_transformation_curve_type=='0x01') { | | |
|     gain | | |
|     offset | | |
|     coeff_a | 4 | uimsbf |
|   } | 4 | uimsbf |
|   else if (DR_transformation_curve_type=='0x02') { | | |
|     gain | | |
|     offset | | |
|     coeff_a | | |
|   } | | |
|   else if (DR_transformation_curve_type=='0x03') { | | |
|     gain | | |
|     offset | | |
|     coeff_n | | |
|   } | | |
|   else if (DR_transformation_curve_type=='0x04') { | | |
|     entry_length | | |
|     for (i=0; i<entry_length; i++) { | | |
|       in_value | | |
|       out_value | | |
|     } | | |
|   } | | |
| } | | |

FIG. 17

$$\text{out} = \text{gain} \times \text{in} + \text{offset} \quad \sim\!\text{L17010}$$

$$\text{out} = \text{gain} \times e^{(\text{coeff?in})} + \text{offset} \quad \sim\!\text{L17020}$$

$$\text{out} = \text{gain} \times \log(\text{coeff} \times \text{in}) + \text{offset} \quad \sim\!\text{L17030}$$

$$\text{out} = \text{gain} \times \text{in}^{\text{coeff\_n}} + \text{offset} \quad \sim\!\text{L17040}$$

FIG. 18

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0; i < N; i++) { | | |
|         descriptor() | | |
|     } | | |
|     for (i = 0; i < N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i = 0; i < N2; i++) { | | |
|             descriptor() | | |
|         } | | |
|     } | | |
|     CRC_32 | 32 | rpchof |
| } | | |

— L18010

Enhanced_gamut_mapping_info_descriptor( )

| Syntax | No. of bits | Format |
|---|---|---|
| UHD_program_info_descriptor ( ) { | | |
|     descriptor_tag | 8 | uimsbf |
|     descriptor_length | 8 | uimsbf |
|     UHD_service_type | 4 | uimsbf |
|     Reserved | 4 | |
| } | | |

L18020

| UHD_service_type | 사용 예시 |
|---|---|
| 0000 | UHD1 |
| 0001 | UHD2 |
| 0010-0111 | Reserved |
| 1000-1111 | User_private |

L18030

UHD_service_type = 1011
(UHD1 service with enhanced gamut mapping metadata)

FIG. 19

| Syntax | No. of bits | Format |
|---|---|---|
| event_information_table_section() { | | |
|     table_id | 8 | 0×CB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0; j< num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0; i<N; i++) { | | |
|             descriptor() | | |
|         } | | |
|     } | | |
|     CRC_32 | 32 | rpchof |
| } | | |

UHD_program_info_descriptor
Enhanced_gamut_mapping_info_descriptor()

FIG. 20

| Syntax | No. of bits | Format | |
|---|---|---|---|
| Enhanced_gamut_mapping_info_descriptor ( ) { | | | L20010 |
|     descriptor_tag | 8 | uimsbf | |
|     descriptor_length | 8 | uimsbf | |
|     reserved | 4 | | |
|     number_of_info | 4 | | |
|     for(i=0; i<number_of_info; i++) { | | | |
|         enhanced_gamut_mapping_metadata () | | | |
|     } | | | |
| } | | | |

| Syntax | No. of bits | Format | |
|---|---|---|---|
| enhanced_gamut_mapping_metadata (payloadSize) { | | | L20020 |
|     original_color_gamut_type | 4 | uimsbf | |
|     target_color_gamut_type | 4 | uimsbf | |
|     if(original_color_gamut_type =='0110'){ | | | |
|         RGBW_primaries() | | | |
|     } | | | |
|     if(target_color_gamut_type =='0110'){ | | | |
|         RGBW_primaries() | | | |
|     } | | | |
|     reserved | 4 | uimsbf | |
|     initial_mapping_type | 4 | uimsbf | |
|     initial_mappng_info() | | | |
|     color_space_type | 4 | uimsbf | |
|     color_space_conversion_flag | 1 | uimsbf | |
|     reserved | 3 | uimsbf | |
|     if(color_space_conversion_flag =='1'){ | | | |
|         color_space_conversion_function() | | | |
|     } | | | |
|     number_of_regions | 4 | uimsbf | |
|     reserved | 4 | uimsbf | |
|     for(i=0; i<number_of_regions; i++) { | | | |
|         region_boundary_type | 4 | uimsbf | |
|         reserved | 4 | uimsbf | |
|         region_boundary_info() | | | |
|         adaptive_mapping_weight_type | 4 | uimsbf | |
|         reserved | 4 | uimsbf | |
|         weighting_function_info () | | | |
|     } | | | |
| } | | | |

METHOD AND APPARATUS FOR TRANSMITTING AND RECEIVING BROADCAST SIGNAL SO AS TO ADJUST COLOUR RANGE OF CONTENT

This application is a National Stage of International Application No. PCT/KR2015/011692, filed Nov. 3, 2015 which claims the benefit of U.S. Provisional Application No. 62/074,656, filed on Nov. 4, 2014, the disclosures of which are incorporated herein by reference in their entirety.

TECHNICAL FIELD

The present invention relates to a method and apparatus for transmitting and receiving a broadcast signal.

BACKGROUND ART

As one of methods of providing image quality that cannot be provided in a conventional service by an ultra high definition (UHD)-based broadcast and content service, the standard for wide color gamut has been established and used as service standard. However, as a UHD service has been actively discussed before an image capturing device and a display technology for supporting wide color gamut are completed, it is expected that equipments and content with different color gamut are interchangeably used in an ecosystem. When content and a display have the same color gamut, a service can be provided without any serious problem and when the content and the display have different color gamut, there is a need to adjust color gamut according to last capability of the display.

In addition, along with the development of video service technologies in a SDTV and an HDTV in addition to legacy analog broadcast, the standard color gamut has been established and consistent color gamut has been used for image acquisition, post-processing, transmission, and display. That is, there is color gamut (e.g. REC. 709) for target service (e.g. HDTV) according to one-to-one correspondence and as production and transmission end performs post-processing based on the color gamut and then transmits the result and, thus, it is not necessary to consider a different in color gamut in each step. However, various types of color gamut have been considered for UHDTV. For example, REC. 709 this currently used in HDTV and BT. 2020 established as the UHDTV standard have been considered as color gamut of UHDTV. However, a currently used image capturing device has supported only REC. 709-based color gamut. (Alternatively, as wide color gamut as possible, e.g., DCI-P3 and xvYCC is supported but does not reach color gamut of BT. 2020.) In addition, most currently used displays are displays that can output REC. 709-based images. As such, it is expected that a time needs to be taken to introduce BT. 2020 color gamut with respect to both image acquisition and output apparatuses (display devices) and there has been an increasing need to develop a service for supporting both two color gamut (REC. 709 and BE. 2020) in a single broadcast service.

DISCLOSURE

Technical Problem

An object of the present invention devised to solve the problem lies in a method of reproducing content with wide color gamut by a display with low color gamut.

Another object of the present invention devised to solve the problem lies in a method of converting wide color gamut of content into low color gamut.

Another object of the present invention devised to solve the problem lies in a method of signaling information items used to convert wide color gamut of content into low color gamut.

Technical Solution

The object of the present invention can be achieved by providing a method of transmitting a broadcast signal, the method including encoding video data and signaling information including metadata of gamut of the video data, generating a broadcast signal including the encoded video data and signaling information, and/or transmitting the generated broadcast signal.

The metadata may include original gamut information indicating gamut of the video data and target gamut information indicating target gamut as a conversion target of gamut of the video data.

The metadata may include information on the number of regions present in the target gamut, information indicating a method of distinguishing the regions, and detailed information for distinguishing the regions according to the method of distinguishing the regions.

The detailed information for distinguishing the regions may include information on a start point and end point for calculation of a distance as a reference for distinguishing the regions and coordinate information on one or more color spaces for distinguishing the regions.

The metadata may include information indicating a type of a weighting function used to convert gamut of the video data into target gamut and information indicating a coefficient used in the weighting function.

The signaling information may include ultra high definition (UHD) service information indicating a type of a UHD service including the video data, and the UHD service information may include information for identifying that the UHD service is a UHD broadcast service including the metadata.

In another aspect of the present invention, provided herein is a method of receiving a broadcast signal, the method including receiving a broadcast signal including video data and signaling information including metadata of gamut of the video data, extracting the video data and the signaling information from the received broadcast signal, and/or decoding the extracted video data and signaling information.

The metadata may include original gamut information indicating gamut of the video data and target gamut information indicating target gamut as a conversion target of gamut of the video data.

The metadata may include information on the number of regions present in the target gamut, information indicating a method of distinguishing the regions, and detailed information for distinguishing the regions according to the method of distinguishing the regions.

The detailed information for distinguishing the regions may include information on a start point and end point for calculation of a distance as a reference for distinguishing the regions and coordinate information on one or more color spaces for distinguishing the regions.

The metadata may include information indicating a type of a weighting function used to convert gamut of the video data into target gamut and information indicating a coefficient used in the weighting function.

The signaling information may include ultra high definition (UHD) service information indicating a type of a UHD service including the video data, and the UHD service information may include information for identifying that the UHD service is a UHD broadcast service including the metadata.

In another aspect of the present invention, provided herein is an apparatus for transmitting a broadcast signal, the apparatus including an encoder configured to encode video data and signaling information including metadata of gamut of the video data, a broadcast signal generator configured to generate a broadcast signal including the encoded video data and signaling information, and/or a transmitter configured to transmit the generated broadcast signal.

In another aspect of the present invention, provided herein is an apparatus for receiving a broadcast signal, the apparatus including a receiver configured to receive a broadcast signal including video data and signaling information including metadata of gamut of the video data, an extractor configured to extract the video data and the signaling information from the received broadcast signal, and/or a decoder configured to decode the extracted video data and signaling information.

Advantageous Effects

The present invention may provide a method of reproducing content with wide color gamut by a display with low color gamut.

The present invention may provide a method of converting wide color gamut of content into low color gamut.

The present invention may provide a method of signaling information used to convert wide color gamut of content into low color gamut.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 is a diagram illustrating a configuration of enhanced gamut mapping information and a configuration of an enhanced_gamut_mapping_info SEI message for transmitting the enhanced gamut mapping information according to an exemplary embodiment of the present invention;

FIG. 8 is a diagram illustrating configurations of an original_color_gamut_type field and a target_color_gamut_type field according to an exemplary embodiment of the present invention;

FIG. 9 is a diagram illustrating configurations of an initial_mapping_type field, a color_space_type field, a region_boundary_type field, and an adaptive_mapping_weight_type field according to an exemplary embodiment of the present invention;

FIG. 10 is a diagram illustrating a configuration of RGB-W_primaries( ) according to an exemplary embodiment of the present invention;

FIG. 11 is a diagram illustrating a configuration of initial_mappng_info( ) according to an exemplary embodiment of the present invention;

FIG. 12 is a diagram illustrating a transform formula used when a linear mapping function is used in initial gamut mapping and a type of an LUT when the LUT is used in initial gamut mapping, according to an exemplary embodiment of the present invention;

FIG. 13 is a diagram illustrating a configuration of a color_space_conversion_function( ) according to an exemplary embodiment of the present invention;

FIG. 14 is a diagram illustrating a configuration of region_boundary_info( ) according to an exemplary embodiment of the present invention;

FIG. 15 is a diagram illustrating configurations of a distance_start_point_type field and a distance_end_point_type field according to an exemplary embodiment of the present invention;

FIG. 16 is a diagram illustrating a configuration of weighting_function_info ( ) according to an exemplary embodiment of the present invention;

FIG. 17 is a diagram illustrating formulae of a weighting function according to an exemplary embodiment of the present invention;

FIG. 18 is a diagram illustrating content for signaling an enhanced gamut mapping-based UHD service according to an exemplary embodiment of the present invention;

FIG. 19 is a diagram illustrating content of signaling an enhanced gamut mapping-based UHD service according to another exemplary embodiment of the present invention;

FIG. 20 is a diagram illustrating a configuration of an Enhanced_gamut_mapping_info_descriptor( ) and a configuration of enhanced gamut mapping information according to an exemplary embodiment of the present invention;

BEST MODE

Reference will now be made in detail to the embodiments, examples of which are illustrated in the accompanying drawings. However, the embodiments should not be construed as limited to the exemplary embodiments set forth herein.

The terminology used herein is for the purpose of describing particular embodiments only and is not intended to limit of the present invention. Unless otherwise defined, all technical terms used herein have the same meaning as commonly understood by one of ordinary skill in the art to which this present invention pertains and will not be interpreted in an overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

Figure 1:
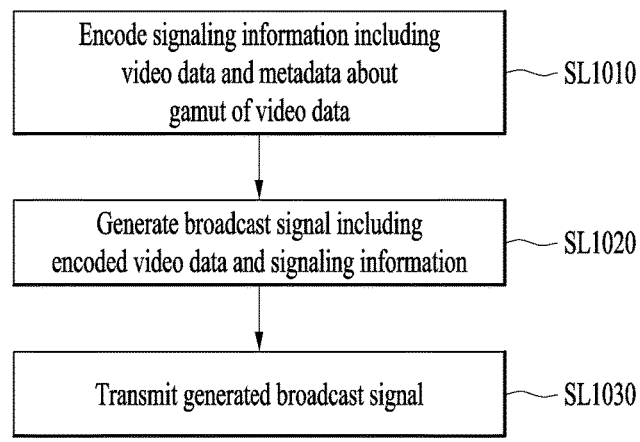
FIG. 1 is a diagram illustrating a method of transmitting a broadcast signal according to an exemplary embodiment of the present invention.

FIG. 1 is a diagram illustrating a method of transmitting a broadcast signal according to an exemplary embodiment of the present invention.

The broadcast signal transmitting method according to an exemplary embodiment of the present invention may include encoding (SL1010) signaling information including video data and metadata about gamut of the video data, generating a broadcast signal including the encoded video data and signaling information (SL1020), and/or transmitting (SL1030) the generated broadcast signal. Here, the metadata may indicate enhanced gamut mapping information. The signaling information may include an SEI message, PMT, EIT, and/or PSI/PSIP, which will be described below in detail with reference to FIG. 7.

According to another exemplary embodiment of the present invention, the metadata may include original gamut information indicating gamut of the video data and/or target gamut information indicating target gamut into which gamut of the video data needs to be converted. Here, the original gamut information may refer to information indicated by an original_color_gamut_type field and the target gamut information may refer to information indicated by a target_color_gamut_type field, which will be described below in detail with reference to FIGS. 7 and 8.

According to another exemplary embodiment of the present invention, the metadata may include information indicating the number of regions present in the target gamut, information indicating a method of distinguishing viding the regions, and/or detailed information for distinguishing the regions according to the method of distinguishing the regions. Here, the information indicating the number of the regions present in the target gamut may refer to information indicated by a number_of_regions field, the information indicating the method of distinguishing the regions may refer to information indicated by a region_boundary_type field, and the detailed information for distinguishing the regions according to the method of distinguishing the regions may refer to information indicated by a region_boundary_info( ), which will be described below in detail with reference to FIGS. 7, 9, and 14.

According to another exemplary embodiment of the present invention, the detailed information for distinguishing the regions may include information on a start point and an end point for calculation of a distance as a reference for distinguishing the regions and/or coordinate information on one or more color spaces for distinguishing the regions. Here, the information on the start point and the end point for calculation of the distance as the reference for distinguishing the regions may refer to information indicated by a distance_start_point_type field, a distance_end_point_type field, a start_x_index field, a start_y_index field, an end_x_index field, and/or an end_y_index field and the coordinate information on one or more color spaces for distinguishing the regions may refer to information indicated by an x_index[i] field and/or a y_index[i] field, which will be described below in detail with reference to FIGS. 14 and 15.

According to another exemplary embodiment of the present invention, the metadata may include information indicating a type of a weighting function used to convert gamut of the video data into target gamut and/or information indicating a coefficient used in the weighting function. Here, the information indicating the type of the weighting function sued to convert the gamut of the video data may refer to information indicated by an adaptive_mapping_weight_type field and the information indicating the coefficient used in the weighting function may refer to a weighting_function_info ( ), which will be described below in detail with reference to FIGS. 7 and 16.

According to another exemplary embodiment of the present invention, the signaling information may include ultra high definition (UHD) service information indicating a type of the UHD service including the video data and the UHD service information may include information for identifying that the UHD service is a UHD broadcast service including the metadata. Here, the UHD service information may refer to a UHD_program_info_descriptor and/or information included in the descriptor. The information for identifying that the UHD service is a UHD broadcast service including the metadata may refer to information indicated by an UHD_service_type field, which will be described below in detail with reference to FIG. 18.

The terms 'broad color range', 'wide color range', and 'wide color gamut (WCG)' used in the specification may have the same meaning. In addition, the terms 'hue range', 'color range', 'color display range', 'color gamut', and 'gamut' used herein may have the same meaning. The term 'color saturation' used herein may be one of scales used to quantitatively indicate color in a color television and may indicate difference in color thickness in the same color, and 1 may correspond to perfect primary color and 0 may correspond to white (in the light case). Furthermore, the color saturation may also be referred to as chroma.

The terms 'information on color gamut', 'color gamut information', and 'color gamut information' used herein may have the same meaning.

The terms 'enhanced gamut mapping' and 'non-linear gamut mapping' used herein may have the same meaning.

The terms 'in-gamut color', 'color of narrow color gamut' and 'color inside target gamut' used herein may have the same meaning.

The terms 'out-of-gamut color', 'color between wide color gamut and narrow color gamut', 'color out of narrow color gamut' and 'color out of target gamut' used herein may have the same meaning.

Figure 2:
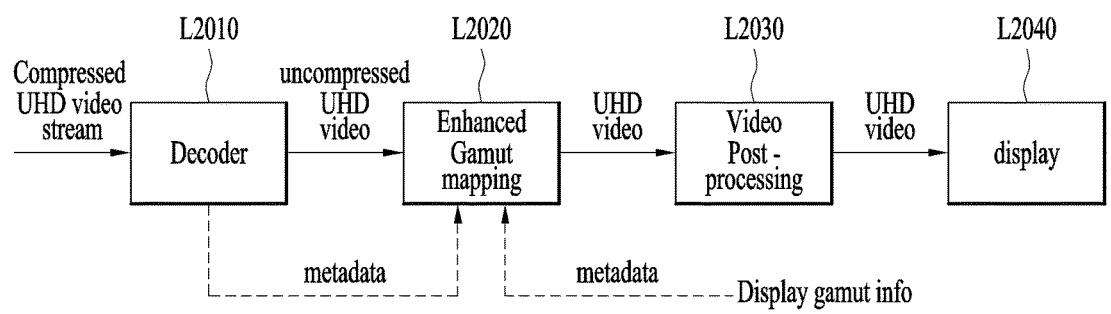
FIG. 2 is a diagram illustrating an operation and structure of a receiver for supporting gamut mapping according to an exemplary embodiment of the present invention.

FIG. 2 is a diagram illustrating an operation and structure of a receiver for supporting gamut mapping according to an exemplary embodiment of the present invention.

An exemplary embodiment of the present invention may provide elements that need to be transmitted to the receiver and factors to be considered during display of content (e.g. BT. 2020) with wide color gamut by a display (e.g. BT. 709) with narrow color gamut. An exemplary embodiment of the present invention relates to a method of acquiring optimal image color expression and may differently perform processing according to a color region while wide color gamut is matched with narrow color gamut. An exemplary embodiment of the present invention may provide a method of providing a video service with optimal color expression in various display environments when color gamut of content and color gamut of display are different. Furthermore, a receiver structure and signaling for the method may be provided.

An exemplary embodiment of the present invention may provide a method of color gamut mapping with respect to color between narrow color gamut and wide color gamut while wide color gamut of content is matched with narrow color gamut. Here, the aforementioned gamut mapping for differently performing processing according to a color region may be referred to as enhanced gamut mapping.

According to an exemplary embodiment of the present invention, an adaptive weight may be applied to an image on which legacy gamut mapping is processed to perform enhanced gamut mapping. Here, as an example of applying the weight, the weight may be calculated using a function of a distance from a center of color gamut.

According to an exemplary embodiment of the present invention, regions of color gamut may be set in order to apply the aforementioned adaptive weight. For example, the color gamut may be divided into a color preserving region and a color converting region, which will be described below in detail.

According to an exemplary embodiment of the present invention, respective weighting functions according to the set color gamut regions may be transmitted and, as necessary, a function for color coordinate conversion may be signaled.

An exemplary embodiment of the present invention may provide an operating method of a receiver according to display capability. According to an exemplary embodiment of the present invention, when a UHD service is provided based on enhanced gamut mapping, an environment for effectively watching the same content in a display with narrow color gamut (legacy display) as well as display with wide color gamut (WCG) display may be provided. According to an exemplary embodiment of the present invention, when video is reproduced in an environment of a display with narrow color gamut, an image with low color saturation, i.e., an image with low image quality in terms of color may be provided. According to an exemplary embodiment of the present invention, a color resampling method may be used in order to preserve color saturation of color inside narrow color gamut. According to an exemplary embodiment of the present invention, in order to reduce loss in color information and to smoothly express both color between wide color gamut and narrow color gamut and color inside narrow color gamut, different mapping functions may be applied according to a corresponding region. An exemplary embodiment of the present invention may provide a method of maintaining quality of color inside predetermined gamut as much as possible and simultaneously mapping color out of predetermined gamut to narrow color gamut.

According to an exemplary embodiment of the present invention, gamut mapping may indicate a procedure of re-expressing video based on one color gamut in another color gamut. According to an exemplary embodiment of the present invention, gamut mapping may indicate a procedure of reducing color gamut in order to express content with most wide color gamut in a display with narrow color gamut.

When content wide color gamut is reproduced in a display with narrow color gamut, color may not be appropriately expressed and thus may be distorted. That is, according to the aforementioned embodiment of the present invention, in order to process color between wide color gamut and narrow color gamut, even if it is possible to already smoothly express color inside narrow color gamut in a display with narrow color gamut, color in narrow color gamut may be distorted and expressed. To prevent this, an exemplary embodiment of the present invention may provide a method of moving a color expressing location of color between wide color gamut and narrow color gamut, i.e., out-of-gamut color while maintaining color expressible in a legacy display as original color as much as possible by dividing color gamut into regions and applying different weights to color corresponding to the regions. According to the aforementioned embodiment of the present invention, when a UHD service is provided, different types of displays may be supported via additional signaling for one content item and gamut mapping. In addition, according to the aforementioned embodiment of the present invention, effectiveness of a UHD service may be enhanced and services with various phases in the case in which a phase-based UHD service such as DVB is considered may also be simultaneously supported.

Referring to the drawing, the receiver according to an exemplary embodiment of the present invention may perform a decoder L2010, enhanced gamut mapping L2020, video post-processing L2030, and display L2040. The receiver according to an exemplary embodiment of the present invention may receive and decode a compressed UHD video stream. Color of the decoded UHD video may be gamut-mapped according to color gamut of a display. In this case, gamut mapping-related metadata and/or gamut information of a display may be used. The gamut-mapped UHD video may be post-processed and the post-processed UHD video may be displayed. The aforementioned enhanced gamut mapping L2020 and the video post-processing L2030 will be described below in detail.

Figure 3:
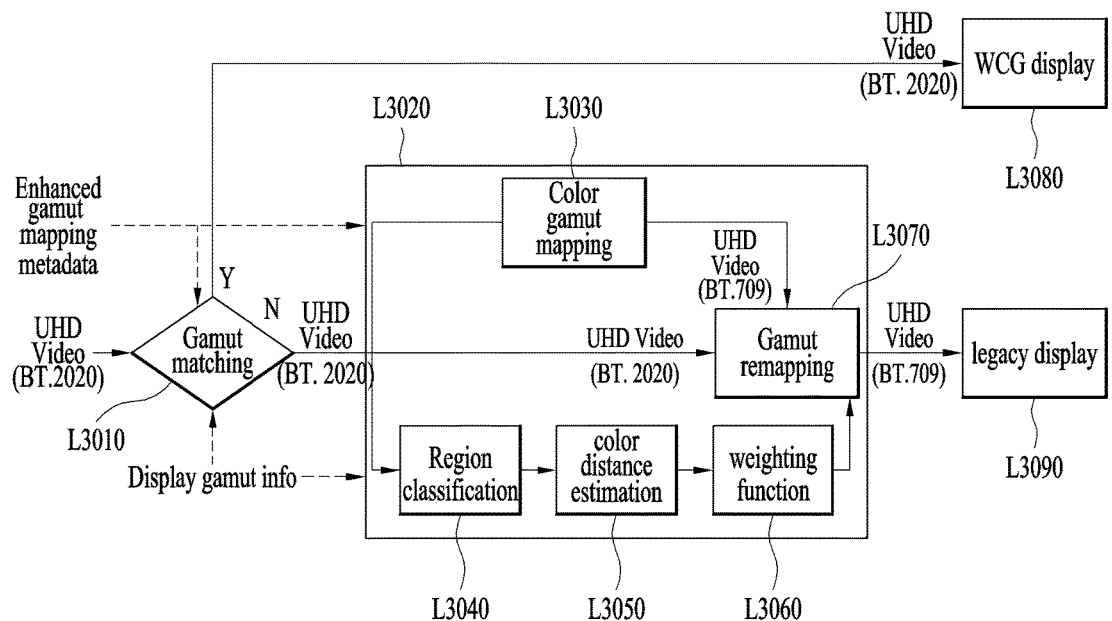
FIG. 3 is a diagram illustrating a detailed operation of an enhanced gamut mapping procedure according to an exemplary embodiment of the present invention.

FIG. 3 is a diagram illustrating a detailed operation of an enhanced gamut mapping procedure according to an exemplary embodiment of the present invention.

The drawing illustrates a procedure of processing received UHD video content when a display of a receiver is a display with wide color gamut (scenario 1) and the display of the receiver is a display with narrow color gamut (scenario 2) during reception of UHD video content with wide color gamut according to an exemplary embodiment of the present invention.

According to an exemplary embodiment of the present invention, when the display of the receiver is a display with wide color gamut (scenario 1), if color gamut of the received video is determined to be expressed by the receiver, the received video may be reproduced without gamut mapping. In this case, information on color gamut of video may be transmitted through video usability information (VUI) and/or a supplemental enhancement information (SEI) message.

In the case of scenario 1, the receiver may perform gamut classification or gamut matching L3010 and/or WCG display L3080.

In the gamut classification, color gamut of video indicated by gamut information of content transmitted through the VUI and/or the SEI message may be compared with color gamut of the display of the receiver to determine whether the display of the corresponding receiver can express color of content, according to an exemplary embodiment of the present invention. When color of content is determined to be expressed in the display of the receiver, the corresponding display may be determined as display with wide color gamut (WCG display) so as to display content without gamut mapping, according to an exemplary embodiment of the present invention.

During the display, the video may be reproduced by the display with wide color gamut according to an exemplary embodiment of the present invention. As necessary, prior to the displaying operation, the video may be post-processed and then video with more enhanced image quality may be reproduced as such.

According to another exemplary embodiment of the present invention, when the display of the receiver is a display with narrow color gamut (scenario 2), if color gamut of the received video is not determined to be expressed by the receiver, enhanced gamut mapping may be performed and video may be processed to be appropriate for a legacy display with narrow color gamut.

In the case of scenario 2, the receiver may perform gamut classification or gamut matching L3010, enhanced gamut mapping L3020, and/or display L3090.

In the gamut classification, color gamut of video indicated by gamut information of content transmitted through the VUI and/or the SEI message may be compared with color gamut of the display of the receiver to determine whether the display of the corresponding receiver can express color of content, according to an exemplary embodiment of the present invention. When color of content is not determined to be expressed without any change in the display of the receiver, the corresponding display may be determined as a legacy display with narrow color gamut and enhanced gamut mapping may be performed on content to convert the content into an image appropriate for the corresponding display, according to an exemplary embodiment of the present invention.

In the enhanced gamut mapping, in order to express content with wide color gamut according to an exemplary embodiment of the present invention by a display with narrow color gamut, color gamut in which content is expressed may be reduced. According to an exemplary embodiment of the present invention, when video is reproduced in an environment of a display with narrow color gamut, an image with low color saturation, i.e., an image with low image quality in terms of color may be provided. According to an exemplary embodiment of the present invention, a color resampling method may be used in order to preserve color saturation of color inside narrow color gamut. According to an exemplary embodiment of the present invention, in order to reduce loss in color information corresponding to out-of-gamut between wide color gamut and narrow color gamut and to smoothly express both color between wide color gamut and narrow color gamut and color inside narrow color gamut, different mapping functions may be applied according to a corresponding region. An exemplary embodiment of the present invention may provide a method of applying different mapping functions (to color adaptively) according to a location on a color coordinate to which color belongs as a method of maintaining quality of color inside narrow color gamut and as much as possible and simultaneously mapping color between wide color gamut and narrow color gamut. According to an exemplary embodiment of the present invention, during the gamut classification and/or the enhanced gamut mapping, enhanced gamut mapping-related metadata and/or display gamut related information may be used. According to an exemplary embodiment of the present invention, the enhanced gamut mapping L3020 may include color gamut mapping L3030, region classification L3040, color distance estimation L3050, weighting function L3060, and/or gamut remapping L3070. According to an exemplary embodiment of the present invention, first, in order to process color between wide color gamut (color gamut of content) and narrow color gamut (color gamut of display), initial gamut mapping may be performed such that all colors of content are within the color gamut of the display (color gamut mapping L3030)). Then, according to an exemplary embodiment of the present invention, the color gamut of the content may be classified into in-gamut of narrow color gamut and out-of-gamut between wide color gamut and narrow color gamut (region classification L3040). Then, according to an exemplary embodiment of the present invention, a distance to a location on a color space of color as a target of gamut mapping from a central portion of color gamut may be measured (color distance estimation L3050). Then, according to an exemplary embodiment of the present invention, an adaptive weight to be used in gamut remapping may be calculated based on the measured distance. In this case, the adaptive weight may be configured as a function of color of each pixel location and, according to the weighting function, color close to a central portion of color gamut (color inside narrow color gamut, in-gamut color) may indicate original color as much as possible and color out of color gamut of a display (color between wide color gamut and narrow color gamut, out-of-gamut color) may indicate smooth color inside the color gamut of the display as much as possible (weighting function calculation L3060). Then, according to an exemplary embodiment of the present invention, color gamut of content may be remapped using the output content of the aforementioned color gamut mapping L3030 and the weighting function derived from the weighting function calculation L3060 (gamut remapping L3070). According to another exemplary embodiment of the present invention, enhanced gamut mapping may be performed based on another procedure and another reference that it not color from a center of color gamut.

In the display L3090, gamut-mapped video according to an exemplary embodiment of the present invention may be reproduced by a legacy UHD display with narrow color gamut. As necessary, prior to display, video may be post-processed to reproduce video enhanced image quality.

Figure 4:
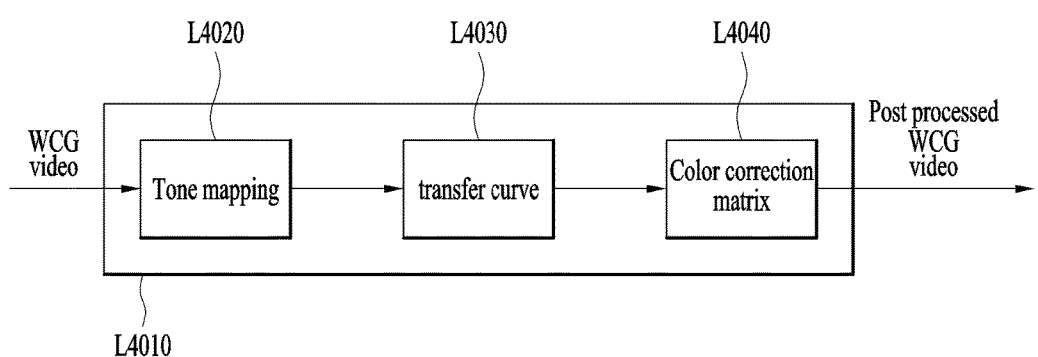
FIG. 4 is a diagram illustrating a video post-processing procedure in detail according to an exemplary embodiment of the present invention.

FIG. 4 is a diagram illustrating a video post-processing procedure in detail according to an exemplary embodiment of the present invention.

According to an exemplary embodiment of the present invention, video post-processing L4010 may include tone mapping L4020, transfer curve L4030, and/or color correction matrix L4040. According to an exemplary embodiment of the present invention, the aforementioned enhanced gamut mapped video and video with wide color gamut on which enhanced gamut mapping is not performed may have enhanced image quality via tone mapping, transfer curve, and/or color correction matrix. Alternatively, as necessary, prior to enhanced gamut mapping, the image processing (video post-processing) illustrated in the thawing may be performed.

Figures 5, 6:
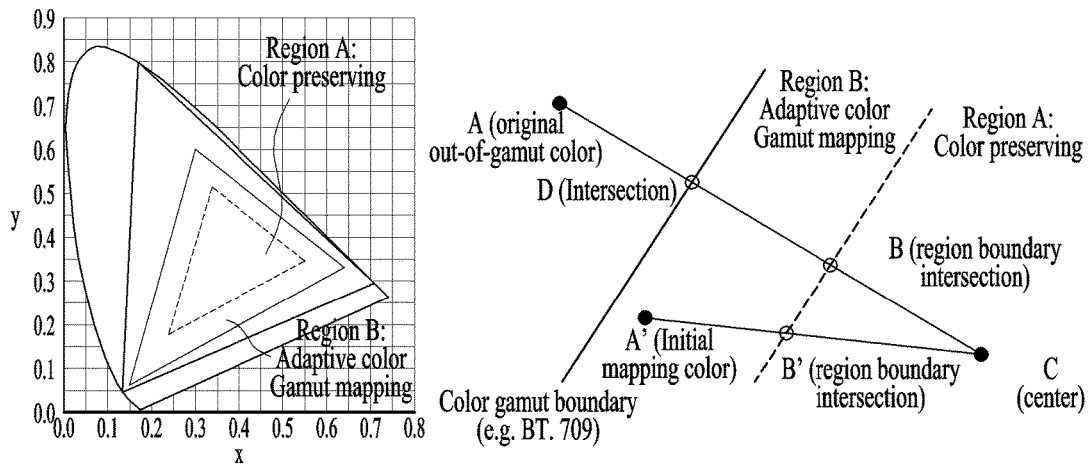
FIG. 5 is a diagram for explanation of an enhanced gamut mapping procedure according to an exemplary embodiment of the present invention.
FIG. 6 is a diagram illustrating formula used in enhanced gamut mapping according to an exemplary embodiment of the present invention.

FIG. 5 is a diagram for explanation of an enhanced gamut mapping procedure according to an exemplary embodiment of the present invention.

According to an exemplary embodiment of the present invention, the enhanced gamut mapping may be used for gamut mapping while maintaining original color as much as possible.

The thawing illustrates an enhanced gamut mapping of BT. 709 from BT. 2020 according to an exemplary embodiment of the present invention. According to an exemplary embodiment of the present invention, BT. 709 as target gamut may be divided into two regions. According to another exemplary embodiment of the present invention, as necessary, the target gamut may be divided into a plurality of regions. In the thawing, region A may correspond to original color gamut BT. 2020 in which original color is maintained and an arbitrary region present in a region with which target color gamut (BT. 709) overlaps. The remaining region except for the region A (color preserving region) in the target gamut may correspond to region B. In the region B, color gamut mapping may adaptively occur. That is, assuming that legacy color gamut mapping is applied to any color on a color plane in the same way, color gamut mapping may be adaptively applied according to a region according to an exemplary embodiment of the present invention. As described above, the adaptive gamut mapping according to a region may be referred to as enhanced gamut mapping.

According to an exemplary embodiment of the present invention, the enhanced gamut mapping may include region setting, region determining, and/or color fusion.

The region setting refers a procedure of determining a color maintaining region in target gamut. According to an exemplary embodiment of the present invention, a coordinate of a corresponding region may be set or a region boundary (point B in the drawing) may be set using a distance from a center of target gamut with respect to an intersection (point D in the drawing) between the target gamut and a straight line connecting a center of the target gamut (point C in the drawing) and original color (point A in the drawing). In this case, formula such as L6010 of the next drawing may be used. In the formula, xB, xD, and xC may be coordinate values on the x axis of points B, D, and C, respectively and α refers to a coefficient obtained by consideration of a distance from a center of the target gamut.

The region determining is a procedure of determining a region to which color belongs when a region in the target gamut is divided into two regions. In this case, determination reference is required and, in this regard, a distance of a straight line connecting a center (point C in the drawing) in a color space and a color coordinate (point A in the drawing) of original color and a distance to an intersection (point B in the drawing) between the straight line and a region boundary from the center of the color space may be compared to determine the region according to an exemplary embodiment of the present invention. In this case, a formula such as L6020 in the next drawing may be used. In the formula, xA, xB, and xC may refer to coordinate values on the x axis of points A, B, and C, respectively, yA, yB, and yC may refer to coordinate values on the y axis of points A, B, and C, respectively, and dAC and dBC may refer to a distance between points A and C and a distance between points B and C of the drawing, respectively.

In the color fusion, according to an exemplary embodiment of the present invention, as a result of the region determining, upon determining that original color (point A in the drawing) is positioned inside the region boundary, original color CI may be maintained and upon determining that the original color is positioned out of the region boundary, the original color CI and initial gamut mapping result MCI may be fused using a weighting function w. Output C0 of the color fusion may indicate color on which last enhanced gamut mapping is performed. In this case, a formula such as L6030 of the next diagram may be used. In addition, in this case, the aforementioned weighting function w may be a function that is inversely proportional to a distance from a color coordinate (point A' in the drawing) of color according to a result of initial gamut mapping from an intersection (point B' in the drawing) between a region boundary and a straight line between a center of a color space and a color coordinate (point A' in the drawing) of color according to a result of initial gamut mapping of original color. That is, the weighting function may be inversely proportional to a distance between the points B' and A' in the drawing. In this case, the weighting function w may be represented by a formula such as L6040 of the next diagram. In the formula, xA', xB', yA', and yB' may be coordinate values on a color space of points A' and B'.

FIG. 6 is a diagram illustrating formula used in enhanced gamut mapping according to an exemplary embodiment of the present invention.

The formula illustrated in the drawing has been described already in detail with reference to the previous diagrams.

FIG. 7 is a diagram illustrating a configuration of enhanced gamut mapping information and a configuration of an enhanced_gamut_mapping_info SEI message for transmitting the enhanced gamut mapping information according to an exemplary embodiment of the present invention.

According to an exemplary embodiment of the present invention, the enhanced gamut mapping may prevent color inside target gamut (in-gamut color) from being excessively reduced to lower color saturation and, simultaneously, may also express color out of target gamut (out-of-gamut color) by a legacy display with narrow color gamut.

According to an exemplary embodiment of the present invention, color may be mapped using a function about a distance to a location of a color space of corresponding color from a center (e.g. white point) of target gamut (e.g. REC. 709). In more detail, according to an exemplary embodiment of the present invention, based on color according to wide color gamut (e.g. BT. 2020) of original content and color modified according to target gamut (e.g. REC. 709) via legacy gamut mapping (legacy linear gamut mapping instead of enhanced gamut mapping) as a reference, color may be mapped to target gamut while a relative color difference between colors according to color gamut of original content is maintained. In this case, an exemplary embodiment of the present invention may provide a method of nonlinearly apply a relative color difference and, when a method of applying different weights according to distances to corresponding color and a region boundary from a center of color gamut of original content is used, a coordinate value on a color space of while color may be used as a center of color gamut of original content.

According to an exemplary embodiment of the present invention, an enhanced_gamut_mapping_info SEI message L7010 may include enhanced gamut mapping information (enhanced_gamut_mapping_info). The enhanced gamut mapping information may include signaling information required for enhanced gamut mapping.

According to an exemplary embodiment of the present invention, enhanced gamut mapping information L7020 may include an original_color_gamut_type field, a target_color_gamut_type field, an RGBW_primaries( ) field, an initial_mapping_type field, an initial_mappng_info( ) field, a color_space_type field, a color_space_conversion_flag field, a color_space_conversion_function( ) field, a number_of_regions field, a region_boundary_type field, a region_boundary_info( ) field, an adaptive_mapping_weight_type field, and/or a weighting_function_info ( ) field.

The original_color_gamut_type field may indicate color gamut of original content. The present field field may indicate color gamut defined in the standard and, when arbitrary color gamut is used, the present field may indicate 0110. According to an exemplary embodiment of the present invention, when arbitrary color gamut that is not defined in the standard is used, red, green, blue, and/or white coordinates may be signaled via the RGBW_primaries( ) field. The original_color_gamut_type field and the RGBW_primaries( ) field will be described in detail.

The target_color_gamut_type field may indicate target gamut of gamut mapping. That is, the present field may indicate target gamut of gamut mapping. According to an exemplary embodiment of the present invention, color gamut of a display with narrow color gamut may be target gamut. According to an exemplary embodiment of the present invention, when a display uses only one type of color gamut, corresponding target gamut may be signaled. According to another exemplary embodiment of the present invention, when the display uses a plurality of types of color gamut, metadata about each color gamut may be transmitted. The pre sent field may indicate color gamut defined according to the standard and, when arbitrary color gamut is used, the present field may indicate 0110. According to an exemplary embodiment of the present invention, arbitrary color gamut that is not defined according to the standard is used, red, green, blue, and/or white coordinates may be signaled via the RGBW_primaries( ) field. The target_color_gamut_type field and the RGBW_primaries( ) field will be described in detail.

The initial_mapping_type field may indicate an initial gamut mapping method. According to an exemplary embodiment of the present invention, a linear gamut mapping method may be used or a display dedicated mapping method may be used. According to an exemplary embodiment of the present invention, during transmission of metadata, a gamut mapping method may be directly defined or a mapping method using a look-up table (LUT) may be used. The present field will be described below in detail.

The initial_mappng_info( ) field may signal information required for initial gamut mapping, which will be described below in detail.

The color_space_type field may indicate a color space as a reference for obtaining a weighting function during the color fusion. According to an exemplary embodiment of the present invention, CIE 1931 Yxy color space may be used and in order to overcome the problem in that a color difference recognized by a human visual system (HVS) does not correspond to a distance on a color space, CIE Luv as a uniform color space may be used. The present field will be described in detail.

The color_space_conversion_flag field may indicate whether a function that is arbitrarily defined as a color space conversion function is used when color conversion is needed to use the corresponding color space. When the present field is 0, a conversion function matched with the corresponding color space may be used, and when the present field is 1, a conversion function according to the color_space_conversion_function( ) may be used. The color_space_conversion_function( ) will be described below in detail.

The number_of_regions field may indicate the number of boundaries present between regions separated for enhanced gamut mapping. A value obtained by adding 1 to a value of the field may be a total number of all separated regions.

The region_boundary_type field may indicate a method of displaying regions separated for enhanced gamut mapping, which will be described below in detail.

The region_boundary_info( ) field may indicate information about regions separated for enhanced gamut mapping. The present field will be described below in detail.

The adaptive_mapping_weight_type field may indicate a type of a weighting function used during the color fusion. According to an exemplary embodiment of the present invention, methods such as a linear function, a quadratic function, a log function, an exponential function, and/or LUT may be used or other methods may be used, which will be described below in detail.

The weighting_function_info( ) field may indicate detailed information on a weighting function indicated by the aforementioned adaptive_mapping_weight_type field.

FIG. 8 is a diagram illustrating configurations of an original_color_gamut_type field and a target_color_gamut_type field according to an exemplary embodiment of the present invention.

According to an exemplary embodiment of the present invention, when a value of the original_color_gamut_type field L8010 is 0000, color gamut may indicate BT. 601, in the case of 0001, color gamut may indicate BT. 709, in the case of 0010, color gamut may indicate DCI-P3, in the case of 0011, color gamut may indicate BT. 2020 (NCL), in the case of 0100, color gamut may indicate BT. 2020 (CL), in the case of 0101, color gamut may indicate XYZ, and in the case of 0110, color gamut may indicate compliance according to user definition.

According to an exemplary embodiment of the present invention, when a value of a target_color_gamut_type field L8020 is 0000, color gamut may indicate BT. 601, in the case of 0001, color gamut may indicate BT. 709, in the case of 0010, color gamut may indicate DCI-P3, in the case of 0011, color gamut may indicate BT. 2020 (NCL), in the case of 0100, color gamut may indicate BT. 2020 (CL), in the case of 0101, color gamut may indicate XYZ, and in the case of 0110, color gamut may indicate compliance according to user definition.

FIG. 9 is a diagram illustrating configurations of an initial_mapping_type field, a color_space_type field, a region_boundary_type field, and an adaptive_mapping_weight_type field according to an exemplary embodiment of the present invention.

According to an exemplary embodiment of the present invention, a value of an initial_mapping_type field L9010 is 0001 a receiver may perform gamut mapping using a linear mapping function. In the case of 0001 (look up table), the receiver may perform gamut mapping using the transmitted look up table (LUT). In the case of 0010 (display mapping function), the receiver may perform gamut mapping using a display dedicated mapping function. In the case of 0011, gamut mapping may be performed using a mapping function defined by a user.

According to an exemplary embodiment of the present invention, when a value of a color_space_type field L9020 is 0001this may indicate that a CIE 1931 Yxv color space is used during gamut mapping according to an exemplary embodiment of the present invention. When the color_space_type is 0001, this may indicate that a CIE Lab color space is used during gamut mapping according to an exemplary embodiment of the present invention. When a color_space_type is 0010, this may indicate that a CIE Luv color space is used during gamut mapping according to an exemplary embodiment of the present invention.

According to an exemplary embodiment of the present invention, when a value of a region_boundary_type field L9030 is 0001, regions separated for enhanced gamut mapping may be indicated in the form of a uniform circle from a center of a color space. In the case of 0010, each region may be indicated in the form of a ratio of a distance to a region boundary of color gamut from a location of corresponding color or a center of a color space. In this case of 0011, each region may be indicated in the form of an arbitrary region coordinate.

According to an exemplary embodiment of the present invention, when a value of an adaptive_mapping_weight_type field L9040 is 0x00, a weighting function used during the color fusion is a linear function, in the case of 0x01, this may indicate a log function, in the case of 0x02, this may indicate an exponential function, in the case of 0x03, this may indicate an n-th function, and in the case of 0x05, this may indicate that LUT is used as a weighting function.

FIG. 10 is a diagram illustrating a configuration of RGB-W_primaries( ) according to an exemplary embodiment of the present invention.

According to an exemplary embodiment of the present invention, when an original_color_gamut_type field and/or a target_color_gamut_type field indicate that an arbitrary color gamut value instead of a value defined according to the standard is used, a transmitter side may transmit a coordinate on a color space of color for defining color gamut. According to an exemplary embodiment of the present invention, color gamut may be defined based on red, green, blue, and white (R, G, B, and W). In addition, according to another exemplary embodiment of the present invention, color gamut may be defined using primary color other than RGB and this case may also be represented via RGBW_primaries( ).

According to an exemplary embodiment of the present invention, the RGBW_primaries ( ) may include a color_primary_r_x field, a color_primary_r_y field, a color_primary_g_x field, a color_primary_g_y field, a color_primary_b_x field, a color_primary_b_y field, a white_primary_x field, and/or a white_primary_y field.

The color_primary_r_x field may indicate an x coordinate of red (R) color on a color space. The present field may indicate a value by binarizing a value between 0 and 1 and indicate a difference value from a reference value.

The color_primary_r_y field may indicate a y coordinate of red (R) color on a color space. The present field may indicate a value by binarizing a value between 0 and 1 and indicate a difference value from a reference value.

The color_primary_g_x field may indicate an x coordinate of green (G) color on a color space. The present field may indicate a value by binarizing a value between 0 and 1 and indicate a difference value from a reference value.

The color_primary_g_y field may indicate a y coordinate of green (G) color on a color space. The present field may indicate a value by binarizing a value between 0 and 1 and indicate a difference value from a reference value. The color_primary_b_x field may indicate an x coordinate of blue (B) on a color space. The present field may indicate a value by binarizing a value between 0 and 1 and indicate a difference value from a reference value.

The color_primary_b_y field may indicate a y coordinate of blue (B) color on a color space. The present field may indicate a value by binarizing a value between 0 and 1 and indicate a difference value from a reference value. Here, the aforementioned color space may correspond to CIE 1931.

The white_primary_x field may indicate an x coordinate of white color on a color space. The present field may indicate a value by binarizing a value between 0 and 1 and indicate a difference value from a reference value.

The white_primary_y field may indicate a y coordinate of white color on a color space. The present field may indicate a value by binarizing a value between 0 and 1 and indicate a difference value from a reference value.

FIG. 11 is a diagram illustrating a configuration of initial_mappng_info( ) according to an exemplary embodiment of the present invention.

According to an exemplary embodiment of the present invention, initial gamut mapping may be used to express color with respect to a region in which color gamut of content with wide color gamut and color gamut of a display with narrow color gamut overlap each other. According to an exemplary embodiment of the present invention, the initial gamut mapping may use the same method as gamut resampling.

According to an exemplary embodiment of the present invention, the initial_mappng_info( ) may include a number_of_coeff field, an Initial_mapping_function_coeff[i] field, an LUT_type field, and/or LUT_info( ).

The number_of_coeff field may indicate the number of coefficients used for conversion of a color space. Furthermore, the present field may indicate the number of elements of a linear mapping function for converting a value represented according to RBG based on current color gamut into an R'G'B' value represented based on target color gamut.

The Initial_mapping_function_coeff[i] field may indicate the number of coefficients used for gamut-mapping a value represented according to RGB based on current color gamut to an R'G'B' value represented based on target color gamut, which will be described below in detail.

The LUT_type field may indicate a type of a look up table (LUT). According to an exemplary embodiment of the present invention, the LUT may refer to a table for matching an input value and an output value according to one-to-one correspondence as one of methods used for color mapping or gamut mapping, which will be described below in detail.

FIG. 12 is a diagram illustrating a transform formula used when a linear mapping function is used in initial gamut mapping and a type of an LUT when the LUT is used in initial gamut mapping, according to an exemplary embodiment of the present invention.

This drawing L12010 is a diagram showing the transform formula used for converting a value represented according to RGB based on current color gamut into an R'G'B' represented based on target color gamut when a linear mapping function is used in initial gamut mapping according to an exemplary embodiment of the present invention.

According to an exemplary embodiment of the present invention, an LUT for matching input values and output values with respect to all colors has enormous data and, thus, it may not be easy to transmit the data in the form of metadata. Accordingly, according to an exemplary embodiment of the present invention, all 3D coordinates of color are not used but an independently matching method to each channel or a method of estimating an LUT constituent element based on a reference point may be used. According to an exemplary embodiment of the present invention, when an LUT_type L12020 is 0001 this may indicate that a type of LUT for independently matching to each channel is used, in the case of 0001, this may indicate that a type of LUT using all 3D coordinates is used, and in the case of 0010, a type of LUT for estimating an LUT constituent element based on a reference point is used.

FIG. 13 is a diagram illustrating a configuration of a color_space_conversion_function( ) according to an exemplary embodiment of the present invention.

According to an exemplary embodiment of the present invention, the color_space_conversion_function( ) may transmit a color space conversion coefficient when a separate color space but not a color space given during a procedure of calculating a color distance to corresponding color from a center of a color space is used. Alternatively, according to an exemplary embodiment of the present invention, the color_space_conversion_function( ) may define a color space conversion coefficient and/or a color space conversion function that is already defined according to the standard or is widely used and permit a receiver to use a predetermined color space conversion function according to a predetermined type.

According to an exemplary embodiment of the present invention, color_space_conversion_function( ) L13010 may be used with the same meaning as Color_space_conversion( ) and, according to an exemplary embodiment of the present invention, the color_space_conversion_function( ) may include a number_of_coeff field and/or a color_space_conversion_coeff[i] field.

The number_of_coeff field may indicate the number of coefficients used for color space conversion.

The color_space_conversion_coeff[i] field may indicate the number of arbitrary color space conversion coefficients. According to an exemplary embodiment of the present invention, although a transform formula L13020 based on a linear matrix is shown, different transform formulae according to a usage method may be used.

FIG. 14 is a diagram illustrating a configuration of region_boundary_info( ) according to an exemplary embodiment of the present invention.

According to an exemplary embodiment of the present invention, the region_boundary_info( ) may include detailed information for respective regions distinguished for enhanced gamut mapping. According to an exemplary embodiment of the present invention, the region_boundary_info( ) may include a distance_start_end point_flag field, a distance_start point_type field, a distance_end point_type field, a start_x_index field, a start_y_index field, an end x_index field, an end_y_index field, an alpha field, a number_of_pointse field, an x_index[i] field, and/or a y_index[i].

The distance_start_end_point_flag field may indicate whether information on a start point and an end point for distinguishing regions is provided. According to an exemplary embodiment of the present invention, the present field may permit only one signaling when there is a plurality of regions. The present field may not be used when a coordinate of a region is directly indicated.

The distance_start_point_type field may indicate information on a start point for calculation of a distance. According to an exemplary embodiment of the present invention, a coordinate of a white point as the start point for calculation of a distance may be used and a value determined by predetermining another central point used as the start point may be used as the start point or a coordinate (start_x_index, start_y_index) for an arbitrary value may be used as the start point. The present field will be described below in detail.

The distance_end_point_type field may indicate information on an end point used for calculation of a distance from a center of a color space. According to an exemplary embodiment of the present invention, a target gamut boundary, a coordinate of original color, and/or a coordinate (end_x_index, end_y_index) of an arbitrary value may be used as an end point. According to another exemplary embodiment of the present invention, the coordinate of an arbitrary value may be used to set an offset, etc. of the coordinate, which will be described below in detail.

The start_x_index field and the start_y_index field may indicate a coordinate of an arbitrary value when a coordinate of an arbitrary value is used as a start point.

The end_x_index field and the end_y_index field may indicate a coordinate of an arbitrary value when a coordinate of an arbitrary value is used as an end point.

The alpha field may indicate a ratio used to distinguish regions when regions distinguished for enhanced gamut mapping is displayed in the form of a uniform circle from a center of a color space or displayed in the form of a function of a distance to a region boundary of color gamut from a center of a color space, according to an exemplary embodiment of the present invention. The present field may be used in a formula used in region setting during the aforementioned enhanced gamut mapping.

The number of points field may indicate the number of coordinates when coordinates of regions distinguished for enhanced gamut mapping are directly signaled, according to an exemplary embodiment of the present invention. According to an exemplary embodiment of the present invention, the present field may have a value equal to or greater than 3.

The x_index[i] field and the y_index[i] field may indicate i-th x and y coordinates for indicating a region.

FIG. 15 is a diagram illustrating configurations of a distance_start_point_type field and a distance_end_point_type field according to an exemplary embodiment of the present invention.

According to an exemplary embodiment of the present invention, when a value of a distance_start_point_type field L15010 is 0001 this may indicate that white point-D65 is used as a start point when a distance for enhanced gamut mapping is calculated, in the case of 0001, this may indicate that white point-D50 is used, and in the case of 0010, this may indicate that a coordinate of an arbitrary value is used.

According to an exemplary embodiment of the present invention, when a value of a distance_end point_type field L15020 is 0001 this may indicate that a target gamut boundary is used as an end point when a distance for enhanced gamut mapping is used, in the case of 0001, this may indicate that a coordinate of original color is used, and in the case of 0010, this may indicate that a coordinate of an arbitrary value is used.

FIG. 16 is a diagram illustrating a configuration of weighting_function_info ( ) according to an exemplary embodiment of the present invention.

According to an exemplary embodiment of the present invention, enhanced gamut mapping may apply different mapping functions according to color. In this case, according to an exemplary embodiment of the present invention, an adaptive mapping function may be a function of a color difference and, in this case, may use a Euclidian distance to color from a center of a color space in order to measure a color difference. According to an exemplary embodiment of the present invention, a weighting function may be inversely proportional to a weight and may be a normalized function such that a weight has a value between 0 and 1. According to an exemplary embodiment of the present invention, when a LUT is used instead of a weighting function, an out_value corresponding to in_value may be signaled. Here, according to an exemplary embodiment of the present invention, a mapping function, an adaptive mapping function, and a weighting function may have the same meaning.

According to an exemplary embodiment of the present invention, the weighting_function_info ( ) may include a gain value and/or an offset value when a value of an adaptive_mapping_weight_type field (DR_transformation_curve_type field in the drawing) is 0x00, that is, when a linear function is used as a weighting function. According to an exemplary embodiment of the present invention, the above values may be used as a coefficient of a linear function L17010 illustrated in the next diagram.

According to an exemplary embodiment of the present invention, the weighting_function_info ( ) may include a gain value, a coeff a value, and/or an offset value when a value of the adaptive_mapping_weight_type field (DR_transformation_curve_type field in the drawing) is 0x01, that is, when a log function is used as a weighting function. According to an exemplary embodiment of the present invention, the above values may be used as a coefficient of a log function L17020 illustrated in the next diagram.

According to an exemplary embodiment of the present invention, the weighting_function_info ( ) may include a gain value, a coeff a value, and/or an offset value when a value of the adaptive_mapping_weight_type field (DR_transformation_curve_type field in the drawing) is 0x02, that is, when an exponential function is used as a weighting function. According to an exemplary embodiment of the present invention, the above values may be used as a coefficient of an exponential function L17030 illustrated in the next drawing.

According to an exemplary embodiment of the present invention, the weighting_function_info ( ) may include a gain value, a coeff n value, and/or an offset value when a value of the adaptive_mapping_weight_type field (DR_transformation_curve_type field in the drawing) is 0x03, that is, when an n-th function is used as a weighting function. According to an exemplary embodiment of the present invention, the above values may be used as a coefficient of an n-th function L17040 illustrated in the next drawing.

According to an exemplary embodiment of the present invention, the weighting_function_info ( ) may include an entry_length value, an in_value value, and/or an out_value when a value of the adaptive_mapping_weight_type field (DR_transformation_curve_type field in the drawing) is 0x04 or 0x05, that is, when an LUT is used instead of a weighting function.

According to an exemplary embodiment of the present invention, when there is a plurality of periods, different weighting functions may be used in the respective periods.

FIG. 17 is a diagram illustrating formulae of a weighting function according to an exemplary embodiment of the present invention.

A detailed description of the formulae of the weighting function illustrated in the drawing has been given with reference to the previous drawings.

FIG. 18 is a diagram illustrating content for signaling an enhanced gamut mapping-based UHD service according to an exemplary embodiment of the present invention.

According to an exemplary embodiment of the present invention, information indicating that a corresponding UHD service is an enhanced gamut mapping-based UHD service may be signaled using a program map table (PMT).

According to an exemplary embodiment of the present invention, the enhanced gamut mapping information may be transmitted through an SEI message, transmitted in a stream loop of a PMT, or transmitted in an event loop of an event information table (EIT).

According to an exemplary embodiment of the present invention, a PMT L18010 may include a table_id field, a section_syntax_indicator field, a section_length field, a program_number field, a version_number field, a current_next_indicator field, a section_number field, a last_section_number field, a PCR_PID field, a program_info_length field, a descriptor( ), a stream_type field, an elementary_PID field, an ES_info_length field, a descriptor( ), and/or a CRC_32 field. The table_id field may identify a type of a table. The table_id field may indicate that a corresponding table section is a section included in the PMT. The section_syntax_indicator field may indicate format of a table section subsequent to the corresponding field. When a value of the corresponding field is 0, the corresponding table section is short format. When a value of the corresponding field is 1, the corresponding table section complies with general long format. The section_length field may indicate a length of the corresponding table section. The section_length field may indicate a length of an end of the corresponding table section from the corresponding field and, thus, an actual length of the corresponding table section may be a value obtained by adding 3 bytes to a value indicated by the sercion_length field. The program_number field may identify a virtual channel or each program service present in a transport stream. The version_number field may indicate a version number of a private table section. The receiver may search for a most recent table section among table sections stored in a memory using the corresponding field and the current_next_indicator field that will be described below. When a value indicated by the current_next_indicator field is 1, this may indicate that a currently transmitted table is valid and, when the value is 0, the currently transmitted table is not valid but is valid in the future. The section_number field may indicate an order of the corresponding section in the corresponding table. The last_section_number field may indicate an order of a last section among sections included in the corresponding table. The PCR_PID field may indicate a packet ID in which program clock reference (PCR) for a program service is present. The program_info_length field may indicate a length of a descriptor indicating program information (program_info) subsequent thereto. The descriptor( ) may refer to a descriptor indicating information on a program corresponding to the corresponding table section. According to an exemplary embodiment of the present invention, the descriptor may include a UHD_program_info_descriptor( ) for identifying a type of a UHD service. The stream_type field may indicate a type of each unit stream constituting a program described by the corresponding table. The elementary_PID field may indicate a packet ID of each unit stream constituting a program described by the corresponding table. The ES_info_length field may indicate a length of a descriptor indicating information (ES_info) on each unit stream subsequent thereto. The descriptor( ) may refer to a descriptor indicating information on one unit stream among unit streams constituting a program described by the corresponding table. The descriptor may include an Enhanced_gamut_mapping_info_descriptor( ). The CRC_32 field may indicate a CRC value used to check whether error is present in data included in the corresponding table. According to an exemplary embodiment of the present invention, the PMT may be transmitted in-band via MPEG-TS or entire PSI information including the PMT may be transmitted in the form of xml via IP.

According to an exemplary embodiment of the present invention, a descriptor included in a program loop of a PMT may include a UHD_program_info_descritpor( ) and a descriptor included in a stream loop of a PMT may include an Enhanced_gamut_mapping_info_descriptor( ) indicating enhanced gamut mapping information.

According to an exemplary embodiment of the present invention, a UHD_program_info_descritpor( ) L18020 may be included in a program loop of a PMT and may include a descriptor_tag_field, a descriptor_length field, and/or UHD_service_type field. The descriptor_tag field may indicate that the descriptor is a UHD_program_info_descritpor( ) for identifying a UHD service. The descriptor_length field may indicate a length of the descriptor. The UHD_service_type field may indicate a type of a UHD service.

According to an exemplary embodiment of the present invention, when a value of a UHD_service_type field L18030 is 0001 a UHD1 service may be identified, in the case of 0001, a UHD2 service may be identified, and in the case of 1011, an enhanced gamut mapping-based UHD1 service may be identified.

According to an exemplary embodiment of the present invention, an UHD_service_type field may indicate information on a type of a UHD service (e.g., UHD1 (4K), UHD2 (8K), and a type of a UHD service determined by a user according to quality). According to an exemplary embodiment of the present invention, UHD_service_type=1011 (UHD1 service with enhanced gamut mapping metadata, example of 4K) may be determined to signal that enhanced gamut mapping is used.

FIG. 19 is a diagram illustrating content of signaling an enhanced gamut mapping-based UHD service according to another exemplary embodiment of the present invention.

According to an exemplary embodiment of the present invention, an EIT may include a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last_table_id field, an event_id field, a start_time field, a duration field, a running_status field, a free_CA_mode field, a descriptors_loop_length field, a descriptor( ), and/or a CRC_32 field. The table_id field may identify a type of a table. The table_id field may indicate that a corresponding table section is a section included in the EIT. The section_syntax_indicator field may indicate format of a table section subsequent to the corresponding field. When a value of the corresponding field is 0, this may indicate that the corresponding table section is short format. When a value of the corresponding field is 1, the corresponding table section may comply with general long format. The section_length field may indicate a length of the corresponding table section. The section_length field may indicate a length to an end of the corresponding table from the corresponding field. The service_id field may identify each service present in a transport stream. The service_id field may have the same function as the program_number field in a PMT. The version_number field may indicate a version number of a private table section. The receiver may search for a most recent table section among table sections stored in a memory using the corresponding field and the current_next_indicator field that will be described below. When a value of the current_next_indicator field is 1, this may indicate that a currently transmitted table is valid and, when the value is 0, the currently transmitted table is not valid but is valid in the future. The section_number field may indicate an order of the corresponding section in the corresponding table. The last_section_number field may indicate an order of a last section among sections included in the corresponding table. The transport_stream_id field may identify a transport stream (TS) to be described by the corresponding table. The original_network_id field may identify a first broadcaster that transmits a service or event described in the corresponding table. The segment_last_section_number field may indicate a last section number of a corresponding segment when a sub table is present. When a sub table is not divided, a value of the corresponding field may have the same value as a value indicated by the last_section_number field. The last_table_id field may indicate a last used table_id. The event_id field may identify each event and have a unique value in one service. The start_time field may indicate a start time of a corresponding event. The duration field may indicate a duration time of a corresponding event. For example, in the case of a program maintained for one hour 45 minutes 30 seconds, the duration field may indicate a value of 0x014530. The running_status field may indicate a status of a corresponding event. When a value indicated by the free_CA_mode field is 0, this may indicate that component streams included in a service are not scrambled and in the case of 1, this may indicate that access to one or more streams is adjusted by a CA system. The CA system may be an abbreviation of a conditional access system and may refer to a system for providing an encryption function of broadcast content and a function for only a contractor to decode and to watch broadcast content in order to limit broadcast watching to the contractor. The descriptors_loop_length field may indicate a value obtained by summing lengths of descriptors subsequent to the corresponding field. The descriptor( ) may refer to a descriptor for describing each event. According to an exemplary embodiment of the present invention, the descriptor may include a descriptor including a Enhanced_gamut_mapping_info_descriptor( ) and/or a UHD_program_info_descriptor( ) indicating a type of a UHD service. The CRC_32 field may indicate a CRC value used to check whether error is present in data included in the corresponding table section.

According to an exemplary embodiment of the present invention, a descriptor included in an event loop of an EIT may include the aforementioned UHD_program_info_descritpor( ) and/or a descriptor indicating enhanced gamut mapping information.

According to an exemplary embodiment of the present invention, UHD_service_type=1011 (User private: UHD1 service with enhanced gamut mapping metadata, example of 4K) in UHD_program_info_descritpor( ) according to an exemplary embodiment of the present invention in an event loop of the EIT may be determined to signal that enhanced gamut mapping is used.

According to an exemplary embodiment of the present invention, when a value of the UHD_service_type field in the UHD_program_info_descritpor( ) according to an exemplary embodiment of the present invention is 0000 (UHD1 service) in an event loop of the EIT, whether the Enhanced_gamut_mapping_info_descriptor( ) is present may be checked to recognize whether enhanced gamut mapping is used. Here, the Enhanced_gamut_mapping_info_descriptor( ) may indicate a descriptor indicating enhanced gamut mapping information. According to an exemplary embodiment of the present invention, the Enhanced_gamut_mapping_info_descriptor( ) may signal that information for mapping wide color gamut to narrow color gamut is transmitted in an event level.

According to an exemplary embodiment of the present invention, in the case of cable broadcast, information included in the aforementioned EIT may be included in AEIT.

FIG. 20 is a diagram illustrating a configuration of an Enhanced_gamut_mapping_info_descriptor( ) and a configuration of enhanced gamut mapping information according to an exemplary embodiment of the present invention.

According to an exemplary embodiment of the present invention, an Enhanced_gamut_mapping_info_descriptor( ) L20010 may include a descriptor_tag field, a descriptor_length field, number_of_info_field, and/or enhanced_gamut_mapping_metadata ( ).

The descriptor_tag field may indicate that the descriptor is a descriptor including enhanced mapping information.

The descriptor_length field may indicate a length of the descriptor.

The number_of_info field may indicate the number of enhanced gamut mapping modes intended by a manufacturer. According to an exemplary embodiment of the present invention, according to the number of target gamut, a plurality of enhanced gamut mapping information items may be transmitted.

Enhanced_gamut_mapping_metadata ( ) L20020 may indicate enhanced gamut mapping information. According to an exemplary embodiment of the present invention, the enhanced_gamut_mapping_metadata, the enhanced_gamut_mapping_info, and the enhanced gamut mapping information may have the same meaning. A detailed description of the enhanced gamut mapping information has been given above.

Figure 21:
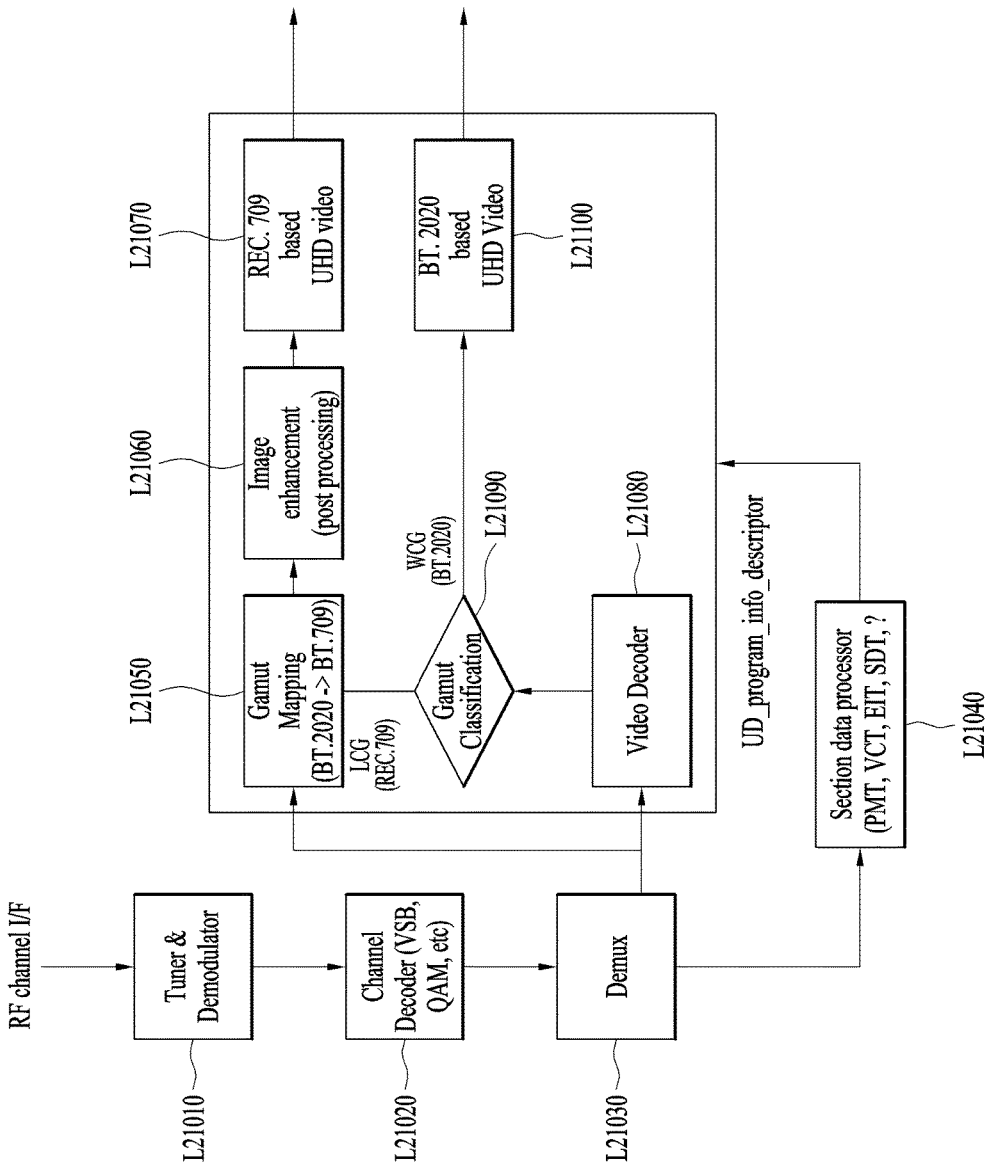
FIG. 21 is a diagram illustrating a structure of an enhanced gamut mapping-based UHD receiver according to an exemplary embodiment of the present invention.

FIG. 21 is a diagram illustrating a structure of an enhanced gamut mapping-based UHD receiver according to an exemplary embodiment of the present invention.

An operation of the receiver according to an exemplary embodiment of the present invention may comply with the following procedure.

According to an exemplary embodiment of the present invention, the receiver may recognize whether there is a separate service or media to be additionally received to configure original UHDTV broadcast using the UHD_program_info_descriptor of the received PMT. According to an exemplary embodiment of the present invention, when a value of the UHD_service_type field in the received UHD_program_info_descriptor is 1011, the receiver may recognize that there is additional information transmitted through an SEI message. In addition, according to an exemplary embodiment of the present invention, when a value of the UHD_service_type field in the received UHD_program_info_descriptor is 0000 (8K is 0001) and the gamut_mapping_info_descriptor is transmitted through the EIT, the receiver may recognize that there is additional information related to video transmitted through an SEI message.

According to an exemplary embodiment of the present invention, it may be important whether color gamut of content is color gamut that can be displayed by a display of the receiver. According to an exemplary embodiment of the present invention, whether the color gamut of the content is color gamut that can be displayed by the display of the receiver may be determined using color gamut information of content transmitted to VUI. According to an exemplary embodiment of the present invention, when color gamut of content is determined to be color gamut that can be displayed by the display of the receiver, an intermediate gamut mapping procedure may be omitted and a video post-processing procedure may be immediately performed to reproduce content. However, according to an exemplary embodiment of the present invention, when the color gamut of the content is determined to exceed color gamut that can be displayed by the display of the receiver, the receiver may recognize color gamut represented by content using additional information transmitted along with content and perform a color gamut conversion procedure for appropriate display by the display of the receiver based on the recognized color gamut.

According to an exemplary embodiment of the present invention, the receiver may recognize color gamut and target gamut of actual content, an initial gamut mapping method, region distinguishing information, a method of calculating a weight, etc. via the enhanced_gamut_mapping_info SEI message and/or the enhanced_gamut_mapping_info_descriptor of the EIT.

According to an exemplary embodiment of the present invention, upon determining that the target gamut type information (target_color_gamut_type) acquired through the enhanced_gamut_mapping_info SEI message and/or enhanced_gamut_mapping_info_descriptor of EIT is color gamut to be appropriately displayed by the display and determining that a gamut mapping method to be used can be processed by the receiver, the receiver may perform enhanced gamut mapping. In this case, according to an exemplary embodiment of the present invention, the receiver may convert color gamut indicated by the Original_color_gamut_type according to the Gamut_mapping_type into color gamut indicated by the Target_color_gamut_type. In this case, according to an exemplary embodiment of the present invention, the receiver may convert color gamut using a function determined by the receiver or convert color gamut using a coefficient of a function that is directly transmitted by a manufacturer. According to an exemplary embodiment of the present invention, the receiver may receive information on a color space in which gamut mapping is performed through the color_space_type field. Furthermore, according to an exemplary embodiment of the present invention, the receiver may perform a post-processing procedure (color matrix correction, etc.) for color enhancement during gamut mapping.

According to an exemplary embodiment of the present invention, in the enhanced gamut mapping, color gamut conversion with different degrees may be performed on a plurality of regions obtained by dividing a target color space. According to an exemplary embodiment of the present invention, a transmitter may signal the number of regions through the number_of_regions field and transmit boundary information of each region (region_boundary_type) and/or weighting function feature of each region (adaptive_mapping_weight_type).

According to an exemplary embodiment of the present invention, the region boundary and/or the weighting function depend upon a distance on a color space and, thus, an appropriate color space needs to be generated as a reference (color_space_type). According to an exemplary embodiment of the present invention, when the Color_space_conversion_flag field is 0, a transform formula defined for each color space may be used, and in the case of 1, a color space as a reference may be generated using a value transmitted through the color_space_conversion_function.

According to an exemplary embodiment of the present invention, the detailed information on a region boundary may be transmitted through the region_boundary_info( ) According to an exemplary embodiment of the present invention, the detailed information on the region boundary may include information on a start point (distance_start point_type, and white point or arbitrary point for each color temperature) used to calculate a distance on a color space, an end point (distance_end_point_type, gamut boundary, original color coordinate, etc.), and/or a method of setting a region boundary (ratio on straight line and coordinate transmission).

According to an exemplary embodiment of the present invention, the detailed information on the weighting function of each region may be transmitted through the weighting_function_info( ). According to an exemplary embodiment of the present invention, the weighting function may display color closer to original color toward a center of color gamut (as a distance is reduced) and a weight is further applied to a value of (out-of-gamut) initial gamut mapping away from the center of the color gamut.

According to an exemplary embodiment of the present invention, when color is determined to be close to the center of color gamut according to determination of a region, original color may be maintained and, on the other hand, when color belongs to a range equal to or greater than a predetermined distance from the center of color gamut, a color space coordinate of final color may be acquired using a value mapped via initial gamut mapping, original color, and/or a weighting function of a corresponding region.

According to an exemplary embodiment of the present invention, the receiver may output an image with more enhance color or brightness via a video post processing procedure prior to final display. In this case, according to an exemplary embodiment of the present invention, a Target_color_gamut_type transmitted in an SEI message and/or color primary value of RGBW (color_primary_A_x, color_primary_A_y, where A is R, G, B, and W) may be used.

According to an exemplary embodiment of the present invention, the receiver may include a tuner L21010, a demodulator L21010, a channel decoder L21020, a demultiplexer L21030, a section data processor L21040, a gamut mapping L21050, a post processing L21060, a video decoder L21080, and/or a gamut classification L21090. The receiver may receive a broadcast signal including enhanced gamut mapping information and content with wide color gamut. The demodulator may demodulate the received broadcast signal. The channel decoder may channel-decode the demodulated broadcast signal. The demultiplexer may extract signaling information, video data, audio data, etc. including enhanced gamut mapping information, etc. from the broadcast signal. The section data processor may process section data such as PMT, VCT, EIT, and SDT from the received signaling information. The gamut mapping may map wide color gamut for representing content to narrow color gamut. The post processing may perform a procedure such as tone mapping in order to enhance color of content. The video decoder may decode a received video stream. The gamut classification may compare color gamut of content and color gamut of display to determine that the display can display color gamut of the content. As a determination result, when it is determined that the display can display the color gamut of the content, content L21100 (BT. 2020 based UHD video) with wide color gamut may be immediately displayed. On the other hand, when the display cannot display the color gamut of the content, the enhanced gamut mapping according to an exemplary embodiment of the present invention may be performed on the content with wide color gamut and, then, the converted content L21070 (REC. 709 based UHD video) may be displayed.

Figure 22:
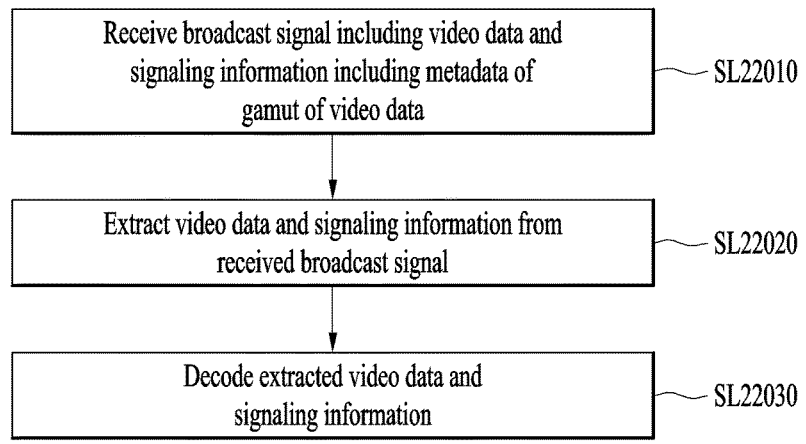
FIG. 22 is a diagram illustrating a method of receiving a broadcast signal according to an exemplary embodiment of the present invention.

FIG. 22 is a diagram illustrating a method of receiving a broadcast signal according to an exemplary embodiment of the present invention.

According to an exemplary embodiment of the present invention, the broadcast signal receiving method may include receiving a broadcast signal including video data and signaling information including metadata of gamut of the video data (SL22010), extracting the video data and the signaling information from the received broadcast signal (SL22020), and/or decoding the extracted video data and signaling information (SL22030). Here, the metadata may indicate enhanced gamut mapping information. The signaling information may include an SEI message, PMT, EIT, and/or PSI/PSIP, which has been described above in detail with reference to FIG. 7.

According to another exemplary embodiment of the present invention, the metadata may include original gamut information indicating gamut of the video data and/or target gamut information indicating target gamut as a conversion target of gamut of the video data. Here, the original gamut information may refer to information indicated by the original_color_gamut_type field and the target gamut information may refer to information indicated by the target_color_gamut_type field, which has been described above in detail with reference to FIGS. 7 and 8.

According to another exemplary embodiment of the present invention, the metadata may include information indicating the number of regions present in the target gamut, information indicating a method for distinguishing the regions, and/or detailed information for distinguishing the regions according the method of distinguishing the regions. Here, the information indicating the number of the regions present in the target gamut may refer to information indicated by the number_of_regions field, the information indicating the method of distinguishing the regions may refer to information indicated by the region_boundary_type field, and the detailed information for distinguishing the regions according to the method of distinguishing the regions may refer to the region_boundary_info( ) which has been described above in detail with reference to FIGS. 7, 9, and 14.

According to another exemplary embodiment of the present invention, the detailed information for distinguishing the regions may include information on a start point and an end point for calculation of a distance as a reference for distinguishing the regions and/or coordinate information on one or more color spaces for distinguishing the regions. Here, the information on the start point and the end point for calculation of a distance as the reference for distinguishing the regions may refer to information indicated by a distance_start_point_type field, a distance_end_point_type field, a start_x_index field, a start_y_index field, an end_x_index field, and/or an end_y_index field and the coordinate information on one or more color space for distinguishing the regions may refer to information indicated by an x_index[i] field and/or a y_index[i] field, which has been described above in detail with reference to FIGS. 14 and 15.

According to another exemplary embodiment of the present invention, the metadata may include information indicating a type of a weighting function used to convert gamut of the video data into target gamut and/or information indicating the number of coefficients used in the weighting function. Here, the information indicating a type of a weighting function used to convert gamut of the video data into target gamut may refer to information indicated by an adaptive_mapping_weight_type field and the information indicating the number of coefficients used in the weighting function may refer to weighting_function_info ( ), which has been described above in detail with reference to FIGS. 7 and 16.

According to another exemplary embodiment of the present invention, the signaling information may include UHD service information indicating a type of an ultra high definition (UHD) service including the video data and the UHD service information may include information for identifying that the UHD service is a UHD broadcast service including the metadata. Here, the UHD service information may refer to the UHD_program_info_descriptor and/or information included in the descriptor. The information for identifying that the UHD service is a UHD broadcast service including the metadata may refer to information indicated by the UHD_service_type field, which has been described above in detail with reference to FIG. 18.

Figure 23:
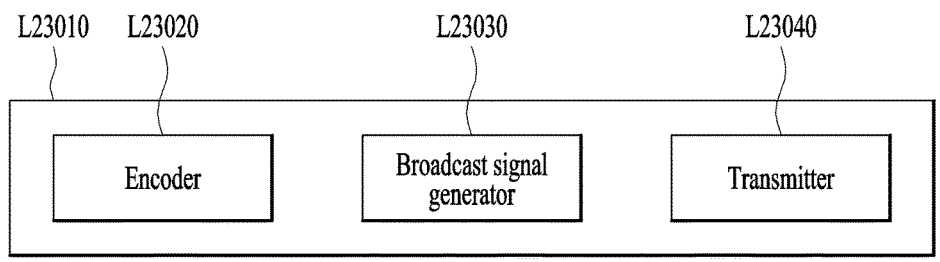
FIG. 23 is a diagram illustrating a structure of an apparatus for transmitting a broadcast signal according to an exemplary embodiment of the present invention.

FIG. 23 is a diagram illustrating a structure of an apparatus for transmitting a broadcast signal according to an exemplary embodiment of the present invention.

According to an exemplary embodiment of the present invention, a broadcast signal transmitting apparatus L23010 may include an encoder L23020 for encoding video data and signaling information including metadata of gamut of the video data, a broadcast signal generator L23030 for generating a broadcast signal including the encoded video data and signaling information, and/or a transmitter L23040 for transmitting the generated broadcast signal. Here, according to an exemplary embodiment of the present invention, the encoder may correspond to a decoder of a receiving side, the broadcast signal generator may correspond to a demultiplexer, and the transmitter may correspond to a receiver.

Figure 24:
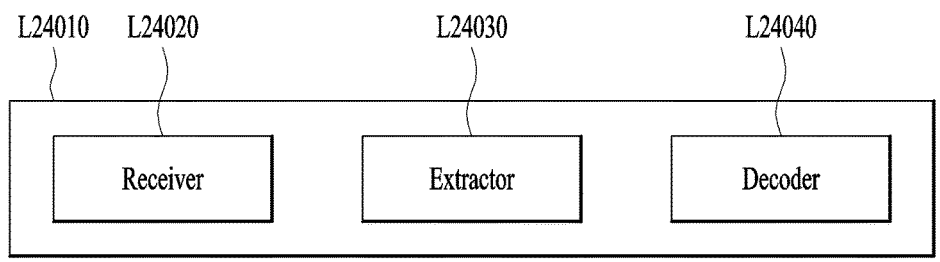
FIG. 24 is a diagram illustrating a structure of an apparatus for receiving a broadcast signal according to an exemplary embodiment of the present invention.

FIG. 24 is a diagram illustrating a structure of an apparatus for receiving a broadcast signal according to an exemplary embodiment of the present invention.

According to an exemplary embodiment of the present invention, the broadcast signal receiving apparatus L24010 may include a receiver L24020 for receiving a broadcast signal including video data and signaling information including metadata of gamut of the video data, an extractor L24030 for extracting the video data and the signaling information from the received broadcast signal, and/or a decoder L24040 for decoding the extracted video data and signaling information. Here, the broadcast signal receiving apparatus L24010 may indicate the same apparatus as the aforementioned broadcast signal in the specification. Here, the receiver may be the same as the receiver described with reference to FIG. 21, the extractor may be the same as the demultiplexer described with reference to FIG. 21, and the decoder may be the same as the decoder and/or audio described with reference to FIGS. 2 and 21. The module, unit, or block according to the exemplary embodiments of the present invention may be processor/hardware for executing consecutive operations stored in a memory (or storage unit). Each of the operations or methods described with regard to the aforementioned exemplary embodiments of the present invention may be performed by hardware/processors. In addition, methods proposed according to the present invention may be executed as a code. The code may be written in a storage media readable by a processor and, accordingly, may be readable by a processor provided by the apparatus according to the exemplary embodiments of the present invention.

Throughout this specification, the drawings have been separately described for convenience of description. However, it is obvious that an embodiment obtained by combining some features of the drawings is within the scope of the present invention. In addition, exemplary embodiments of the present invention can include a computer readable medium including program commands for executing operations implemented through various computers.

The device and method according to the present specification are not limited to the configurations and methods of the above-described embodiments. That is, the above-described embodiments may be partially or wholly combined to make various modifications.

The image processing method according to the present specification can be embodied as processor readable codes on a processor readable recording medium. The processor readable recording medium is any data storage device that can store data which can be thereafter read by a processor. Examples of the processor readable recording medium include read-only memory (ROM), random-access memory (RAM), magnetic tapes, floppy discs, optical data storage devices, carrier wave such as transmission via the Internet, etc. The processor readable recording medium can also be distributed over network coupled computer systems so that the processor readable code is stored and executed in a distributed fashion.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

In addition, throughout this specification, both device and method inventions have been described. As necessary, the description of the device and method inventions may be applied supplementarily.

[BEST MODE]

Reference will now be made in detail to the exemplary embodiments of the present invention, examples of which are illustrated in the accompanying drawings.

INDUSTRIAL APPLICABILITY

The present invention may be used in fields for providing a series of broadcast signals.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a broadcast signal by an apparatus for transmitting a broadcast signal, the method comprising:

encoding video data and signaling information for mapping a position of a color in an original gamut of the video data into a new position in a target gamut different from the original gamut, wherein the signaling information includes initial mapping type information indicating a mapping method for mapping the position of the color and initial mapping information indicating specific information on the mapping method, wherein the signaling information includes region number information indicating the number of regions in the target gamut, the target gamut being divided into the regions to apply a different weight function to each region, wherein the signaling information includes adaptive mapping type information indicating a type of the weight function used in each region and weight function information indicating coefficients defining the weight function, the weight function being used to remap the new position into another new position in the target gamut;

generating a broadcast signal comprising the encoded video data and signaling information; and transmitting the generated broadcast signal.

2. The method according to claim 1, wherein the signaling information comprises original gamut information indicating type of the original gamut of the video data and target gamut information indicating type of the target gamut.

3. The method according to claim 1, wherein the signaling information comprises information indicating a method of distinguishing the regions and detailed information for distinguishing the regions according to the method of distinguishing the regions.

4. The method according to claim 3, wherein the detailed information for distinguishing the regions comprises information on a start point and end point for calculation of a distance as a reference for distinguishing the regions and coordinate information on one or more color spaces for distinguishing the regions.

5. The method according to claim 1, wherein the weight function depends on the new position of the color in the target gamut, the new position being calculated by the mapping method based on the initial mapping type information.

6. The method according to claim 1, wherein:
the broadcast signal comprises ultra high definition (UHD) service information indicating a type of a UHD service comprising the video data; and
the UHD service information comprises information for identifying that the UHD service is a UHD broadcast service comprising the signaling information.

7. A method of receiving a broadcast signal by an apparatus for receiving a broadcast signal, the method comprising:
receiving a broadcast signal comprising video data and signaling information for mapping a position of a color in an original gamut of the video data into a new position in a target gamut different from the original gamut,
wherein the signaling information includes initial mapping type information indicating a mapping method for mapping the position of the color and initial mapping information indicating specific information on the mapping method,
wherein the signaling information includes region number information indicating the number of regions in the target gamut. the target gamut being divided into the regions to apply a different weight function to each region,
wherein the signaling information includes adaptive mapping type information indicating a type of the weight function used in each region and weight function information indicating coefficients defining the weight function, the weight function being used to remap the new position into another new position in the target gamut;
extracting the video data and the signaling information from the received broadcast signal; and
decoding the extracted video data and signaling information.

8. The method according to claim 7, wherein the signaling information comprises original gamut information indicating a type of the original gamut of the video data and target gamut information indicating type of the target gamut.

9. The method according to claim 7, wherein the signaling information comprises information indicating a method of distinguishing the regions and detailed information for distinguishing the regions according to the method of distinguishing the regions.

10. The method according to claim 9, wherein the detailed information for distinguishing the regions comprises information on a start point and end point for calculation of a distance as a reference for distinguishing the regions and coordinate information on one or more color spaces for distinguishing the regions.

11. The method according to claim 7, wherein the weight function depends on the new position of the color in the target gamut, the new position being calculated by the mapping method based on the initial mapping type information.

12. The method according to claim 7, wherein:
the broadcast signal comprises ultra high definition (UHD) service information indicating a type of a UHD service comprising the video data; and
the UHD service information comprises information for identifying that the UHD service is a UHD broadcast service comprising the signaling information.

13. An apparatus for transmitting a broadcast signal, the apparatus comprising:
an encoder configured to encode video data and signaling information for mapping a position of a color in an original gamut of the video data into a new position in a target gamut different from the original gamut,
wherein the signaling information includes initial mapping type information indicating a mapping method for mapping the positionof the color and initial mapping information indicating specific information on the mapping method.
wherein the signaling information includes region number information indicating the number of regions in the target gamut. the target gamut being divided into the regions to apply a different weight function to each region,
wherein the signaling information includes adaptive mapping type information indicating a type of the weight function used in each region and weight function information indicating coefficients defining the weight function, the weight function being used to remap the new position into another new position in the target gamut;
a broadcast signal generator configured to generate a broadcast signal comprising the encoded video data and signaling information; and
a transmitter configured to transmit the generated broadcast signal.

14. An apparatus for receiving a broadcast signal, the apparatus comprising:
a receiver configured to receive a broadcast signal comprising video data and signaling information for mapping a position of a color in an original gamut of the video data into a new position in a target gamut different from the original gamut,
wherein the signaling information includes initial mapping type information indicating a mapping method for mapping the position of the color and initial mapping information indicating specific information on the mapping method,
wherein the signaling information includes region number information indicating the number of regions in the target gamut, the target gamut being divided into the regions to apply a different weight function to each region,
wherein the signaling information includes adaptive mapping type information indicating a type of the weight function used in each region and weight function information indicating coefficients defining the weight function, the weight function being used to remap the new position into another new position in the target gamut;

an extractor configured to extract the video data and the signaling information from the received broadcast signal; and a decoder configured to decode the extracted video data and signaling information.

\* \* \* \* \*